United States Patent
Lee et al.

(10) Patent No.: US 11,017,777 B2
(45) Date of Patent: May 25, 2021

(54) LANGUAGE PROCESSING METHOD AND APPARATUS

(71) Applicant: Samsung Electronics Co., Ltd., Suwon-si (KR)

(72) Inventors: Min-Joong Lee, Suwon-si (KR); Hodong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 283 days.

(21) Appl. No.: 16/108,717

(22) Filed: Aug. 22, 2018

(65) Prior Publication Data

US 2019/0172466 A1 Jun. 6, 2019

(30) Foreign Application Priority Data

Dec. 4, 2017 (KR) .......... 10-2017-0165397

(51) Int. Cl.
*G06F 40/58* (2020.01)
*G10L 15/30* (2013.01)
*G06N 3/04* (2006.01)
*G06N 3/08* (2006.01)
*G06F 40/44* (2020.01)
*G06F 40/216* (2020.01)
*G06F 40/242* (2020.01)
(Continued)

(52) U.S. Cl.
CPC ............ *G10L 15/30* (2013.01); *G06F 40/216* (2020.01); *G06F 40/242* (2020.01); *G06F 40/284* (2020.01); *G06F 40/44* (2020.01); *G06F 40/58* (2020.01); *G06N 3/0454* (2013.01); *G06N 3/08* (2013.01); *G06N 3/084* (2013.01); *G06N 3/088* (2013.01); *G10L 15/16* (2013.01)

(58) Field of Classification Search
CPC ................................ G10L 15/22; G06F 40/58
See application file for complete search history.

(56) References Cited

U.S. PATENT DOCUMENTS 5,809,461 A 9/1998 Inazumi
7,224,981 B2 5/2007 Deisher et al.
(Continued)

FOREIGN PATENT DOCUMENTS

JP 2004-280467 A 10/2004
KR 10-1599826 B1 3/2016
KR 10-1609184 B1 4/2016

OTHER PUBLICATIONS

Chatterjee, et al. "Guiding Neural Machine Translation Decoding with External Knowledge," Proc. WMT 2017. (Year: 2017).*
(Continued)

*Primary Examiner* — Feng-Tzer Tzeng
(74) *Attorney, Agent, or Firm* — NSIP Law

(57) ABSTRACT

A language processing method and apparatus is disclosed. A language processing apparatus using a neural network may obtain context information from a source text using a neural network-based encoder, generate a prefix token from the context information using a neural network-based main decoder, generate a token sequence including at least two successive tokens sequentially following the prefix token using a skip model in response to the prefix token satisfying a preset condition, and indicate a target text in which the prefix token and the token sequence are combined as an inference result with respect to the source text.

41 Claims, 11 Drawing Sheets

(51) Int. Cl.
*G06F 40/284* (2020.01)
*G10L 15/16* (2006.01)

(56) References Cited

U.S. PATENT DOCUMENTS

| | | | |
|---|---|---|---|
| 7,769,580 | B2 | 8/2010 | Gemello et al. |
| 7,904,294 | B1 | 3/2011 | Rose et al. |
| 8,078,469 | B2 | 12/2011 | White et al. |
| 8,775,181 | B2 | 7/2014 | Ehsani et al. |
| 8,930,194 | B2 | 1/2015 | Newman et al. |
| 9,009,030 | B2 | 4/2015 | Wang et al. |
| 9,026,432 | B2 * | 5/2015 | Zangvil .................. G06F 40/40 704/9 |
| 9,779,085 | B2 * | 10/2017 | Wick ..................... G06F 40/242 |
| 2008/0120102 | A1 * | 5/2008 | Rao ........................ G10L 15/22 704/235 |
| 2013/0138589 | A1 | 5/2013 | Yu et al. |
| 2016/0306794 | A1 | 10/2016 | Huang et al. |
| 2018/0075343 | A1 * | 3/2018 | van den Oord ...... G06N 3/0472 |
| 2018/0373704 | A1 * | 12/2018 | Lee ........................ G06F 40/53 |

OTHER PUBLICATIONS

Sennrich et al., "Neural Machine Translation of Rare Words with Subword Units", arXiv preprint arXiv:1508.07909, Jun. 10, 2016, p. 1-11 (11 pages in English).

Chatterjee et al., "Guiding Neural Machine Translation Decoding with External Knowledge", *Proceedings of the Conference on Machine Translation*, vol. 1, Sep. 2017, p. 157-168 (12 pages in English).

Extended European Search Report dated Apr. 26, 2019 in corresponding European Patent Application No. 18207882.4 (7 pages in English).

Luong, Thang, et al., "Neural Machine Translation—Tutorial ACL 2016", https://sites.google.com/site/acl16nmt/home, Retrieved on Aug. 16, 2018, (pp. 1-5).

Gehring, Jonas, et al., "Convolutional Sequence to Sequence Learning," Cornell University Library arXiv preprint arXiv:1705.03122, May 12, 2017 (pp. 1-15).

Vaswani, Ashish, et al., "Attention is All You Need", *Proceedings of the Conference on Advances in Neural Information Processing Systems*, Dec. 2017 (pp. 1-15).

* cited by examiner

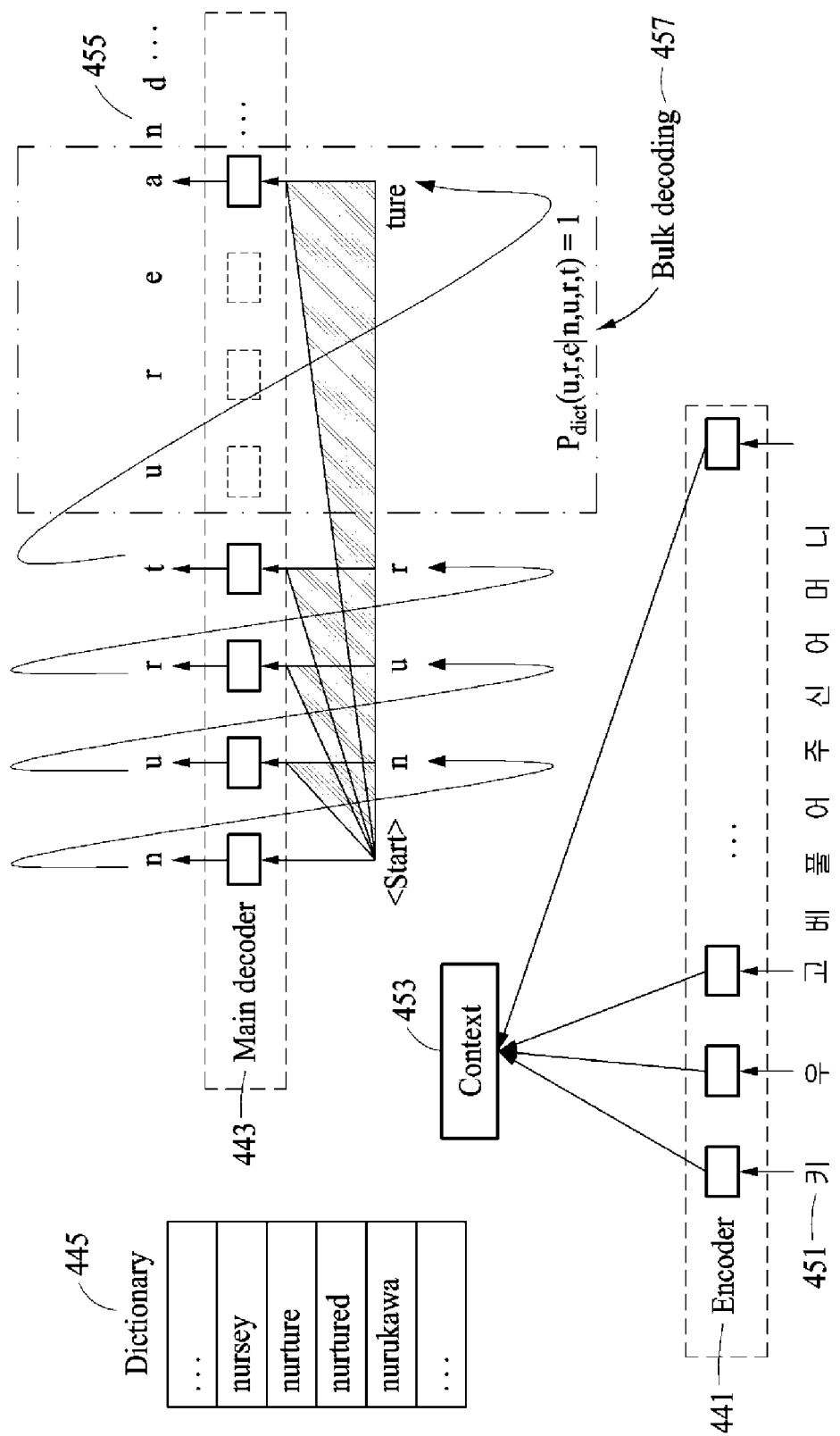

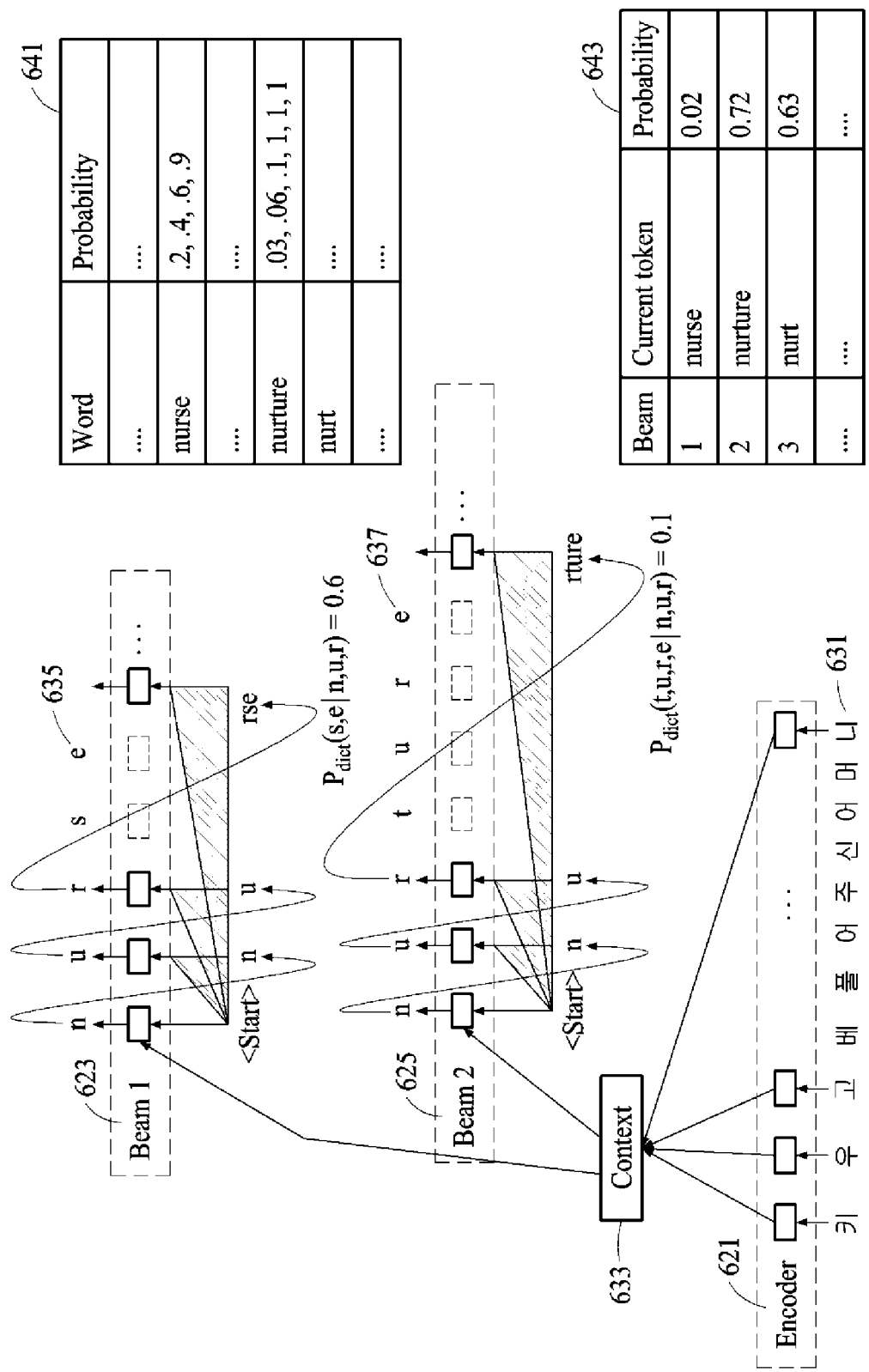

LANGUAGE PROCESSING METHOD AND APPARATUS

CROSS-REFERENCE TO RELATED APPLICATIONS

This application claims the benefit under 35 USC § 119(a) of Korean Patent Application No. 10-2017-0165397 filed on Dec. 4, 2017, in the Korean Intellectual Property Office, the entire disclosure of which is incorporated herein by reference for all purposes.

BACKGROUND

1. Field

The following description relates to technology for automatically processing input language.

2. Description of Related Art

Technological automation of speech recognition and translation has respectively been implemented through processor implemented neural network models, as specialized computational architectures, that after substantial training may provide computationally intuitive mappings between input patterns and output patterns, such as for recognizing spoken speech or translating such recognized speech or otherwise available text. The trained capability of generating such mappings may be referred to as a learning capability of the neural network. Further, because of the specialized training, such specially trained neural network may thereby have a generalization capability of generating a relatively accurate output with respect to an input pattern that the neural network may not have been trained for, for example. However, because such operations or applications are performed through such specialized computation architectures, and in different automated manners than they would have been performed in non-computer implemented or non-automated approaches, they also invite problems or drawbacks that only occur because of the automated and specialized computational architecture manner that they are implement.

SUMMARY

This Summary is provided to introduce a selection of concepts in a simplified form that are further described below in the Detailed Description. This Summary is not intended to identify key features or essential features of the claimed subject matter, nor is this Summary intended to be used as an aid in determining the scope of the claimed subject matter.

In one general aspect, a processor implemented method for language processing using a neural network includes obtaining context information from a source text using a neural network-based encoder, generating a prefix token from the context information using a neural network-based main decoder, in response to the prefix token satisfying a preset condition, generating a token sequence including at least two successive tokens sequentially following the prefix token using a skip model, and indicating a target text in which the prefix token and the token sequence are combined as an inference result with respect to the source text.

The method may further include inputting the prefix token and the token sequence to the main decoder to sequentially generate one or more tokens sequentially following the token sequence.

The main decoder may be configured to generate tokens sequentially.

Based on the prefix token satisfying the preset condition and through the generating of the token sequence by the skip model, the main decoder may non-sequentially decode the context information.

The main decoder may generate tokens sequentially, except that when the skip model generates a corresponding token sequence for a corresponding prefix token the main decoder may skip decoding of tokens sequentially following the corresponding prefix token by next inputting, sequentially after the generating of the corresponding prefix token, the corresponding prefix token and the corresponding token sequence to the main decoder for decoding processing by the main decoder.

The main decoder may be a non-recurrent neural network.

The encoder may be trained to perform a vector transformation of the source text in a first language for the obtaining of the context information, and the main decoder may be trained to perform a translation of the context information into probabilistic information with respect to a different second language corresponding to the target text.

In response to the prefix token not satisfying the condition, the method may further include generating a token sequentially following the prefix token using the main decoder.

The skip model may include a dictionary in which a plurality of words are arranged in alphabetical order.

The condition may include a condition that a probability of the token sequence following the prefix token is greater than or equal to a threshold value.

The skip model may include a neural network-based sub-decoder.

The condition may include a condition that a degree of difficulty of generating the token sequence by the skip model is less than or equal to a threshold value.

The sub-decoder may include first hidden nodes and the main decoder may include second hidden nodes, where one or more hidden nodes of the second hidden nodes may generate a token of the prefix token, at least one hidden node of the first hidden nodes may be configured to receive the prefix token and one or more hidden nodes of the first hidden nodes generate the token sequence, and based on whether the prefix token satisfies the preset condition, another hidden node of the second hidden nodes may be configured to receive the prefix token and the token sequence.

The generating of the prefix token may include generating a prefix token for each of a preset number of beam nodes, and the generating of the token sequence may include generating respective token sequences using the skip model for each of the beam nodes.

The method may further include determining the target text from among candidate texts respectively including the prefix token and the generated respective token sequences for each of the beam nodes.

The skip model may include first hidden nodes and the main decoder may include second hidden nodes, where one or more hidden nodes of the second hidden nodes may generate a token of the prefix token, at least one hidden node of the first hidden nodes may be configured to receive the prefix token and one or more hidden nodes of the first hidden nodes generate the token sequence, and based on whether the prefix token satisfies the preset condition, another hidden node of the second hidden nodes may be configured to receive the prefix token and the token sequence.

The token may include a character, plural characters, a word, or a sentence.

The target text may correspond to a translation result of the source text.

The target text may be a result of generating a natural language corresponding to the source text.

In a general aspect, provided is a non-transitory computer-readable storage medium storing instructions that, when executed by a processor, cause the processor to perform any one or any combination or all operations described herein.

In a general aspect, a language processing apparatus includes one or more processors configured to generate context information from a source text using a neural network-based encoder, generate a prefix token from the context information using a neural network-based main decoder, in response to the prefix token satisfying a preset condition, generate the token sequence sequentially following the prefix token using a skip model configured to generate a token sequence including at least two successive tokens, and indicate a target text in which the prefix token and the token sequence are combined as an inference result with respect to the source text.

The one or more processors may be further configured to input the prefix token and the token sequence to the main decoder to sequentially generate one or more tokens sequentially following the token sequence.

The main decoder may be configured to generate tokens sequentially.

Based on the prefix token satisfying the preset condition and through the generating of the token sequence by the skip model, the main decoder may non-sequentially decode the context information.

When the skip model generates a corresponding token sequence for a corresponding prefix token, the main decoder may skip decoding of tokens sequentially following the corresponding prefix token by next inputting, sequentially after the generating of the corresponding prefix token, the corresponding prefix token and the corresponding token sequence to the main decoder for further decoding processing by the main decoder.

The encoder may be trained to perform a vector transformation of the source text in a first language for the obtaining of the context information, and the main decoder may be trained to perform a translation of the context information into probabilistic information with respect to a different second language corresponding to the target text.

In response to the prefix token not satisfying the condition, the one or more processor may be further configured to generate a token sequentially following the prefix token using the main decoder.

The skip model may include a dictionary in which a plurality of words are arranged in alphabetical order.

The skip model may include a neural network-based sub-decoder.

The language processing apparatus may further include a memory storing respectively trained parameters of the encoder and the main decoder, and respectively trained parameters of the skip model or a skip model dictionary of the skip model including a plurality of words and/or partial words with information indicating relatednesses of the words and/or the partial words, where the one or more processors may be configured to implement the encoder and the main decoder through respective loading and implementing of the respectively trained parameters and configured to selectively implement the skip model through loading and implementing of the parameters of the skip model or implement the skip model using corresponding information indicting relatednesses of select words or partial words in the skip model dictionary based on the prefix token.

The language processing apparatus may further include a memory including instructions, which when executed by the one or more processors, cause the one or more processors to be configured to implement the generating of the context information, generating of the prefix token, indicating of the target text, and the generating of the token sequence in response to the one or more processors determining that the prefix token satisfies the preset condition.

In a general aspect, a processor implemented method for language processing using a neural network may include decoding tokens from context information for a source text using a neural network-based main decoder, including sequentially decoding one or more tokens to identify a prefix token, sequentially following the decoding of the one or more tokens, selectively controlling the decoding of the tokens to be one of performed sequentially, to generate a next token sequentially following the decoding of the one or more tokens, and performed non-sequentially in bulk, to skip decoding of plural next tokens sequentially following the decoding of the one or more tokens, and identifying a target text based on a combination of the prefix token with a select one of the next token and the plural next tokens dependent on the selective control of the decoding of the tokens.

The method may further include indicating the target text as an inference result with respect to the source text.

The method may further include obtaining the context information from the source text using a neural network-based encoder.

The encoder may be trained to perform a vector transformation of the source text in a first language for the obtaining of the context information, and the main decoder may be trained to perform a translation of the context information into probabilistic information with respect to a different second language corresponding to the target text.

The selective controlling of the decoding of the tokens may be dependent on a determination of whether the prefix token satisfies a preset condition.

The method may further include, based on the determination, generating the plural next tokens using, as a skip model, a neural network-based sub-decoder.

The determination may include determining whether a degree of difficulty of generating the plural next tokens is less than or equal to a threshold value.

The method may further include, based on the determination, generating the plural next tokens using a skip model dictionary including plural words arranged in an alphabetical order and relatedness information with respect to differences in similarities respectively between the plural words.

The determination may include determining whether a probability of the plural next tokens following the prefix token is greater than or equal to a threshold value.

The decoding of the tokens may include identifying a prefix token for each of a preset number of beam nodes, and the controlling of the decoding of tokens to be performed non-sequentially in bulk may include generating respective plural next tokens for each of the beam nodes.

The identifying of the target text may be further based on a determination of the target text from among candidate texts respectively including the prefix token and the generated respective plural next tokens for each of the beam nodes.

Other features and aspects will be apparent from the following detailed description, the drawings, and the claims.

BRIEF DESCRIPTION OF THE DRAWINGS

FIG. 4 is a diagram illustrating an example of a language processing method using an NRNN along with a skip model.

FIG. 6B is a diagram illustrating an example of a language processing method using a dictionary of a skip model and an NRNN along with a beam search algorithm.

Figure 1:
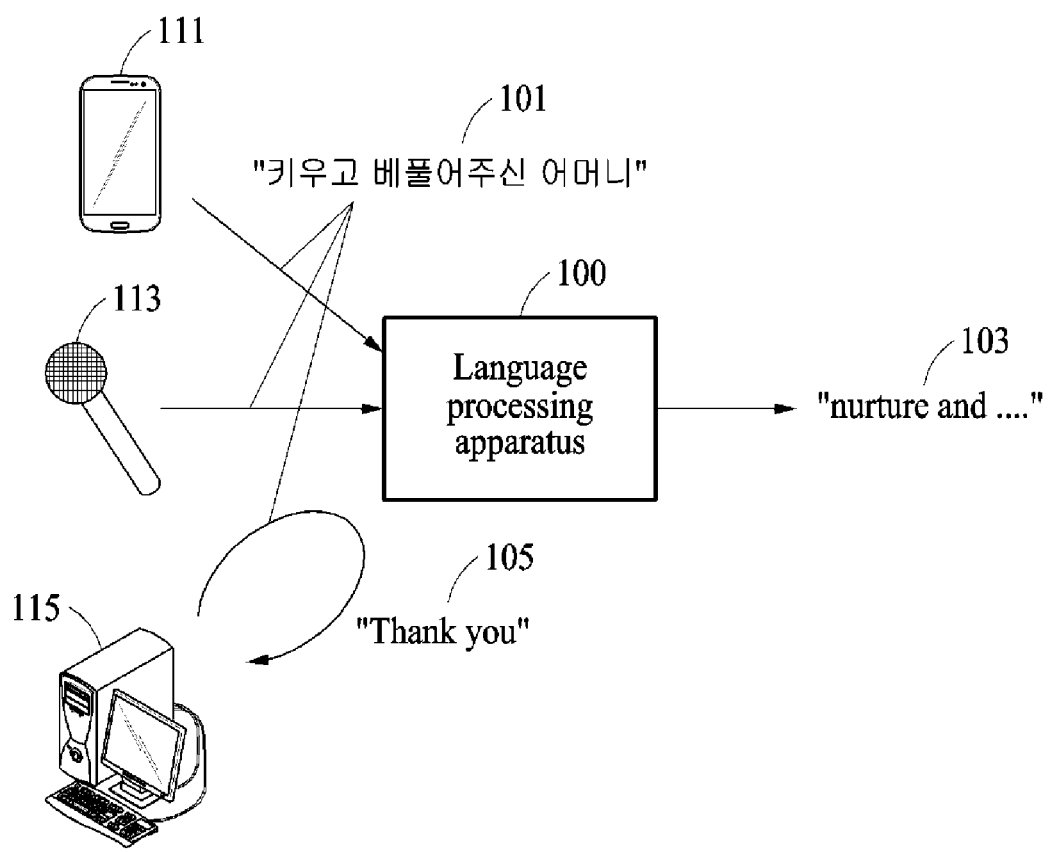
FIG. 1 is a diagram illustrating an example of an overall configuration of a language processing system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

It should be noted that if it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

The terminology used herein is for the purpose of describing particular embodiments only and is not intended to be limiting. For example, as used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, operations, elements, components or one or more combinations/groups thereof in one or more example embodiments, but do not preclude the presence or addition of one or more other features, integers, operations, elements, components, and/or combinations/groups thereof in alternative embodiments, nor the lack of such stated features, integers, operations, elements, and/or components, and/or combinations/groups in further alternative embodiments unless the context and understanding of the present disclosure indicates otherwise. In addition, the use of the term "may" herein with respect to an example or embodiment, e.g., as to what an example or embodiment may include or implement, means that at least one example or embodiment exists where such a feature is included or implemented while all examples and embodiments are not limited thereto.

Unless otherwise defined, all terms, including technical and scientific terms, used herein have the same meaning as commonly understood by one of ordinary skill in the art to which this disclosure pertains based on an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

FIG. 1 is a diagram illustrating an example of an overall configuration of a language processing system.

A language processing apparatus 100 may transform a source text to a target text using a skip model and a non-recurrent neural network (NRNN) or neural network or neural network portion with non-recurrent neural network connections for the transformation. The NRNN means a neural network or neural network portion other than a recurrent neural network (RNN) or recurrent neural network portion, e.g., Deep NN including a Convolutional NN, self-attention NN, etc. The language processing apparatus 100 may be used to reduce a processing time over previous RNN approaches by decoding simultaneously a plurality of tokens using the skip model and the NRNN. The language processing apparatus 100 may also reduce a number of decoding steps in sequence-to-sequence language processing over such RNN approaches. In an example, the language processing may be distinguished from a training process, and include estimation or inference processes.

In an example, the language processing apparatus 100 may perform machine translation. The language processing apparatus 100 may be, or be applicable to, any devices that thereby provide a translation function. The language processing apparatus 100 trained through a training corpus may automatically translate a source text into a target text. For example, as illustrated where the language processing apparatus 100 operates in conjunction with (or as) the smart phone 111, text data 101 input through the smartphone 111, for example, "키우고 베풀어 주신 어머니," may be translated into a target text 103 by the language processing apparatus 100. For another example, as illustrated, speech data 101 input through a microphone 113, for example, "키우고 베풀어 주신 어머니," may be translated into a target text 103 by the language processing apparatus 100. In this example, a target text may correspond to a translation result of a source text. Also, in such examples, the translation result may be indicated to the user or another apparatus, e.g., either explicitly or implicitly. The explicit indication may include a display of the translation result or audible output of the translation result, while an implicit indication may be the language processing apparatus 100, e.g., when the language processing apparatus is the smartphone 111, controlling the implementation of additional functions, operations, or services of the smartphone 111.

In another example, the language processing apparatus 100 may perform natural language generation. For example, the language processing apparatus 100 may be applicable to a dialog system or a question answering system, such as where the smartphone 111 as the language processing apparatus provides a conversation agent to provide and interact dialog with a user or responds to a corresponding query request. Such operations may also be examples of the aforementioned implicit indication of the translation result. In or as the dialog system, the language processing apparatus 100 trained through a training corpus may generate a target text corresponding to a source text. For example, as illustrated, the language processing apparatus 100 may output a dialog result 105, for example, "Thank you" as illustrated, in response to a source text 101 input through a computer 115, for example, "키우고 베풀어 주신 어머니 ." In this example, a target text may be a response to a source text.

In such examples, the respective neural network is a single hidden layer neural network (NN) or a deep neural network (DNN). One or more of the NNs or DNNs may be one or more of a fully connected network, a convolutional neural network, a recurrent neural network, or bi-directional neural network, or may include different or overlapping neural network portions respectively with such full, convolutional, recurrent, and/or bi-directional connections. For example, in some examples, while an encoder and/or decoder portions of a translational model may be implemented with non-recurrent connections, other portions of the translational model may include recurrent or bi-directional connections, such as in examples where the translational model further comprises speech recognition encoder and decoder portions that implement acoustic and/or language models to recognize captured speech to generate source phrasings that may then be provided to an encoder of the translator portion of the translational model. Thus, the neural network may be configured to perform, as non-limiting examples, translation, as well as speech recognition and/or agent conversation or interaction, by respectively mutually mapping input data and output data in nonlinear relationships based on learning, e.g., based on deep learning. The neural network may be configured to perform other sequence-to-sequence mapping or transformations, i.e., other than merely the sequence-to-sequence source language to target language translational operations. Such learning or deep learning is indicative of processor implemented machine learning schemes for solving the corresponding objective issues, such as objective issues related to automated speech recognition, translation, and/or agent conversation or interaction from a big data set, as non-limiting examples. The learning may be implemented by mapping of input data and the output data through supervised or unsupervised learning or training, such that when trained the resultant machine learning model, engine, or example NN may intuitively map further unknown input data to output data with a desired accuracy or reliability.

Each example neural network or neural network portions include one or more input layers, one or more hidden layers, and one or more output layers. The input layer and the output layer may respectively include one or more nodes and the hidden layer(s) may each include a plurality of nodes. When an overall neural network includes multiple portions trained for different objectives, there may or may not be input layers or output layers between the different portions.

Also, in differing examples, data may be input to the input layer in various forms, and in various dimensional forms, input to respective nodes of the input layer of the neural network. In the neural network, nodes of layers other than the output layer are connected to nodes of a subsequent layer through links for transmitting output signals or information from the current layer to the subsequent layer, for example. The number of the links may correspond to the number of the nodes included in the subsequent layer. For example, in adjacent fully connected layers, each node of a current layer may have a respective link to each node of the subsequent layer, noting that in some examples such full connections may later be pruned or minimized during training or optimization. In a recurrent structure portion, such as in a speech recognition portion, a node of a layer may be again input to the same node or layer at a subsequent time, while in a bi-directional structure forward and backward connections may be provided. The links are also referred to as connections or connection weights, as referring to the hardware implemented connections or the corresponding 'connection weights' provided by those connections of the neural network. In convolutional examples, such connections or connection weights may also be provided through different kernel weights of one or more kernels. During training processes such connections or connection weights may be selectively implemented, removed, and varied to generate or obtain a resultant neural network that is thereby trained and that may be correspondingly implemented for the trained objective, such as for any of the above example recognition and/or translational objectives.

The architecture, selective connections between neighboring nodes, and corresponding connection weights may be varied during training. The connection weights of the neuro network may be referred to as parameters of the neural network. For example, in a non-limiting supervised training example, the neural network may be trained based on labeled input image information or desired corresponding output recognitions or classifications and through back-propagation, as only an example. In the training, connection weightings between nodes of different hidden layers may be recursively adjusted, e.g., through back propagation, until the corresponding neural network model is trained with a desired accuracy rate or below a maximum error rate, for example. The respectively trained neuro network may be stored in a memory of any of the training, recognition, and/or translation apparatuses herein. For example, the trained neural network may be stored in trained vectors, matrix or matrices, or other format, where elements of the matrix represent or suggest the corresponding trained weighted connections (parameters) of the corresponding neural network structure. The stored trained neural network may further include hyper-parameter information, which may define the specific structure or architecture of the corresponding neural network for which the example stored trained parameters correspond to. The hyper-parameters may define how many hidden layers, the function of the layers, such as whether they are fully connected or convolutional hidden layers of the neural network structure or neural network portions, e.g., of the example encoder and decoder portions of the translator portion of the translational model discussed further below. In other portions, the hyper-parameters may similarly define the architecture of those portions, such as being fully connected, convolutional, recurrent, bi-directional, etc. The hyper-parameters may further include information of the configuration and values of any bias and/or contextual nodes in the neural network in differing examples, corresponding activation functions of the nodes, as well as any other types of nodes, such as long short-term memory nodes, gated recurrent nodes, or gated linear unit, in some examples. Here, the example neural network information within the neural network may be information resident at, or represented by, respective layers of the neural network, and/or respective information resident at, or represented by, respective connections within the neural network. In some examples, a layer or a series of layers may output or generate one or more extracted feature information of information provided to the layer and dependent on the respective connection weights and types of connections of the layer(s). In this example, the input of each of the layers may be one, two, three, or more dimensional information, such as a multi-dimensional vector, just as the hidden layer(s) respective neural network information and the output of the neural network may also be single or multi-dimensional information dependent on the set parameters and architecture of the neural network. The output of a neural network or neural network may also be probabilistic information or other feature information.

Accordingly, as explained above, the neural network may include a plurality of hidden layers. The neural network including the plural hidden layers may also be referred to herein as a deep neural network (DNN), with training of such a DNN being referred to as deep learning. Also herein, a node included in a hidden layer of such neural networks is referred to as a hidden node, noting that references herein to an input to such a hidden node of the hidden layer may also be understood as referring to an input to plural hidden nodes of the hidden layer.

Typically, neural networks or neural network portions in which plural hidden nodes are recurrently connected in different time intervals are referred to as a recurrent neural network (RNN) or neural network portion with recurrent connections. In such an RNN, a hidden state of a hidden node in a previous time interval may be transferred to hidden nodes in a current time interval. Herein, each time interval may correspond to an order in which each token is processed. For example, in previous machine translation approaches, both encoder and decoder translation operations are performed using respective recurrent neural network portions. Also, because of the recurrent structure, a hidden state of an entire past is required maintained to translate a sequence of a phrase to the sequence of the translated phrase, which prevents parallel computation within a sequence. Said another way, in such recurrent approaches, both the respective training and the inference processes of the respective recurrent neural networks of the encoder and decoder consider tokens in sequence, and thus the encoding and decoding operations in both training and inference operations is limited in processing speed as each token is considered and processed in sequence.

Rather, neural network or neural network portion in which plural hidden nodes are not recurrently connected in different time intervals is referred to herein as an NRNN or non-recurrent neural network portion. In the NRNN, a hidden state of a hidden node in a previous time interval may not be transferred to hidden nodes in a current time interval.

Herein, sequence-to-sequence language processing refers to language processing methods that transform sequential data to sequential data. As noted above, with the typical recurrent structure such sequence-to-sequence language processing requires the maintenance and sharing of hidden states since the beginning of the sequence for subsequent sequential generation of the translated sequential data, and continues with the hidden state generation and sharing as the output data is sequentially generated, with both encoder and decoder portions of the overall translation neural network being recurrent neural networks or recurrent neural network portions, e.g., in an example the overall translation neural network may include neural network portions for the encoder and decoder that respectively perform encoding and decoding functions. Generally, sequential data can be understood to refer to data having timing or sequence. In some examples herein the sequential data may include, for example, speech data and text data, though examples are not limited thereto.

Rather, in an example, the language processing apparatus 100 may transform respective source text, which is sequential data, to context information in parallel in the encoder. The encoder may be a non-recurrent neural network, or an NRNN, in particular. The context information may also be referred to as a context. Herein, the source text may be sequential data, and thus the resultant context information may also be sequential data. In an example, the resultant context data may be a vector including a probability of each token. For example, in respective operations of the training or inference processes the context data may be generated by the encoder and temporarily stored in a buffer or memory of the language processing apparatus 100 as context vector data, which may then be read or provided to the below discussed decoder. A token refers to a unit that divides, apportions, or makes up the source text, such as for example, a word, a character, and a sentence, in the language processing example. In other examples, the context data may be other resultant sequential information, e.g., a vector including respective probabilities of other tokens, such as other tokens dividing other types of source sequential data in other example dependent manners.

As noted above, in an RNN implemented sequence-to-sequence language processing, each of the tokens would be sequentially encoded in order for sequential data. For example, the RNN may sequentially process tokens of respective input texts in a training and inference processes. In other words, the RNN must sequentially encode and sequentially decode the tokens of the input text in the training and inference processes.

Rather, in an NRNN example, a plurality of tokens included in sequential data may be encoded in parallel or simultaneously, or at once, in an encoding process. For example, some or all tokens included in a sequential data may be encoded simultaneously. In an NRNN example the corresponding overall translation neural network may include a non-recurrent encoder and non-recurrent decoder, or respective non-recurrent encoder and decoder portions. The NRNN may thus encode or decode the tokens respectively at once during a training process of the encoding or decoding operations of the corresponding NRNN. For example, parallel or simultaneous decoding may be available with the NRNN decoder during supervised training, for example, because the correct label may be known for each training input. As non-limiting examples, the training process may operate based on training data, while the estimation or inference process may perform an inferring of input real data, e.g., non-training data. Thus, during training, the NRNN may decode a plurality of tokens included in a target text in parallel or simultaneously, or at once, from context information in a training process, and due to this, the NRNN may perform the training process relatively faster than the necessary longer training processes of the RNN implemented sequence-to-sequence language processing. Likewise, because of the simultaneous token encoding operations, the NRNN may perform encoding in the estimation or inference process relatively faster than the RNN implemented sequence-to-sequence language processing. Herein, estimation or inference of a neural network may be synonymous terms for implementing a trained neural network for a trained objective, and thus distinguished from the training process which generates the trained neural network for the corresponding objective.

In such examples, the language processing apparatus 100 may transform the context information, which is sequential data, to a target text using the example decoder, e.g., where the decoder may be a non-recurrent neural network, or an NRNN or corresponding non-recurrent neural network portion of the overall translation neural network, in particular. However, though the decoding operation during training may be performed in parallel or simultaneously, because the tokens of the translation results are known for the training data, when decoding in the estimation or inference process, unlike in the training process, because tokens included in the target text are not known in advance, the tokens are required to be decoded in sequential order, e.g., similar to the aforementioned RNN decoder operations. Thus, though this example decoder may be or have a non-recurrent neural network or neural network portion, referred to herein as the non-recurrent only neural network example, and though training speeds may be greater than those of corresponding training speeds of the RNN implemented sequence-to-sequence language processing, when the trained non-recurrent only neural network decoder operations are actually implemented in estimation or inference processes the example decoder operations may not have substantial speed improvements over the RNN implemented sequence-to-sequence language processing. In such an example, though the encoder may also be implemented with such a non-recurrent neural network or neural network portion, and thus generate context data in parallel or simultaneously, the non-recurrent only neural network decoder implementation becomes a speed impediment to the entire translation operation during the inference operations.

Rather, in one or more further examples, the language processing apparatus 100 may perform bulk decoding, e.g., with some tokens being decoded in parallel or simultaneously, by selectively implementing a skip model to increase an inference processing speed of the decoding operation, e.g., over the above non-recurrent only neural network decoder or RNN based decoder examples where decoding of all tokens must be performed in sequential order during inference operations. Thus, as explained further below, the language processing apparatus 100 may decode a plurality of tokens at once using an NRNN or non-recurrent neural network portion in combination with the skip model. Herein, this respectively performing of encoding or decoding simultaneously, or at once, with such a skip model are also respectively referred to as parallel encoding or parallel decoding. In addition, decoding a plurality of tokens simultaneously, or at once, using such a skip model is also referred herein to as bulk decoding.

The language processing apparatus 100 may generate a token sequence having a high probability of being a correct answer based on at least one token that has been decoded up to a current time, using the skip model to help generate a token sequence subsequent to the at least one token that has been decoded up to the current time. The token sequence may include at least two tokens. Thus, the skip model may enable the language processing apparatus 100 may generate, at once, the token sequence including the at least two tokens and thereby increase a processing speed over previous RNN or non-recurrent only neural network decoder approaches.

Accordingly, such non-recurrent decoding with availability or aspects of such a skip model implementation herein may provide greater accuracy and speed improvements over previous RNN approaches or over non-recurrent only neural network implementations. For example, such non-recurrent encoding and/or decoding based approaches with availability or aspects of such a skip model implementations provide improvements in training and inferring processing speeds and accuracies over previous approaches and previous electronic device implementations, improving the underlying functionality and user experience of the electronic device implementing the sequence-to-sequence transformations, e.g., improving the example sequence-to-sequence translation operations from a source phrase or sentence to a translation result phrase or sentence. Also, because of such accuracy and speed improvements, further features or functions of the electronic device may be available, e.g., where previous delays in inferring operations would have been impediments to more instant or speedy translation explicit or implicit indications.

In an example, the skip model used in the decoding may include a dictionary arranged in a corresponding target language. In this example, the skip model may be generated based on a training corpus of the target language. In another example, the skip model may be a neural network or neural network portion. The skip model, as the neural network or other machine learning approach, is also referred to a sub-decoder. In this sub-decoder example, the skip model may be trained based on a training corpus including a pair of a source language and the target language, and/or the skip model may be trained to generate, in the target language, respective tokens of various token sequences that would be subsequent to respective input token strings. For example and as explained further below, if the input token string is 'nurt', the skip model may be trained to respectively generate u, r, and e for the token sequence.

Thus, using the skip model, the language processing apparatus 100 may estimate or infer the next n tokens with a probability greater than or equal to a threshold value, based on k tokens that have been generated up to a current time. Implementing the skip model, the language processing apparatus 100 may perform the bulk decoding based on the below Equation 1, for example.

$$Pr(tx, tx+1, \ldots tx+n | tx-k, \ldots tx-1) \geq Pth \quad \text{Equation 1:}$$

Referring to Equation 1, when a token string or sequence generated up to a current time is $tx-k, \ldots, tx-1$ and a probability of a next token sequence being $tx, tx+1, \ldots, tx+n$ is greater than or equal to Pth, the language processing apparatus 100 may use the skip model to generate, as the token sequence, tx, tx+1, ..., tx+n. Herein, the token string or sequence generated up to the current time may not need to be a first portion of a word or a sentence and not be restricted by an order, and the token sequence to be estimated or inferred may not need to be a following portion of the word or the sentence and not be restricted by an order.

In the machine translation, the language processing apparatus 100 may use a predetermined dictionary in, as, or with the skip model, and thus because of the predetermined nature of the dictionary the skip model may not output an incorrect translation result that is not present in the dictionary. Because known or real words are stored in the dictionary or used to generate the dictionary, it is possible to prevent an issue that a result of performing decoding on each token is not correct according to rules of orthography, using the dictionary of the skip model.

In the training process, unlike in the language inference processes, the decoder, which is the NRNN, may transform, in parallel, the context information for a training input to a training target text. A training apparatus may train the language processing apparatus 100 such that the encoder and the decoder of the language processing apparatus 100 maximize a probability of such training source texts being transformed to such training target texts.

In a case of the skip model being or using the predetermined dictionary, the language processing apparatus 100 may be trained with training data in a target language. The training data may include a training corpus. The dictionary may be trained based on the same training corpus, for example. In a case of the skip model being a neural network, the language processing apparatus 100 may be trained using a parallel corpus including a pair of a training source text and a training target text in a target language, and the skip model may be trained using the same training target text in the target language.

Figure 2:
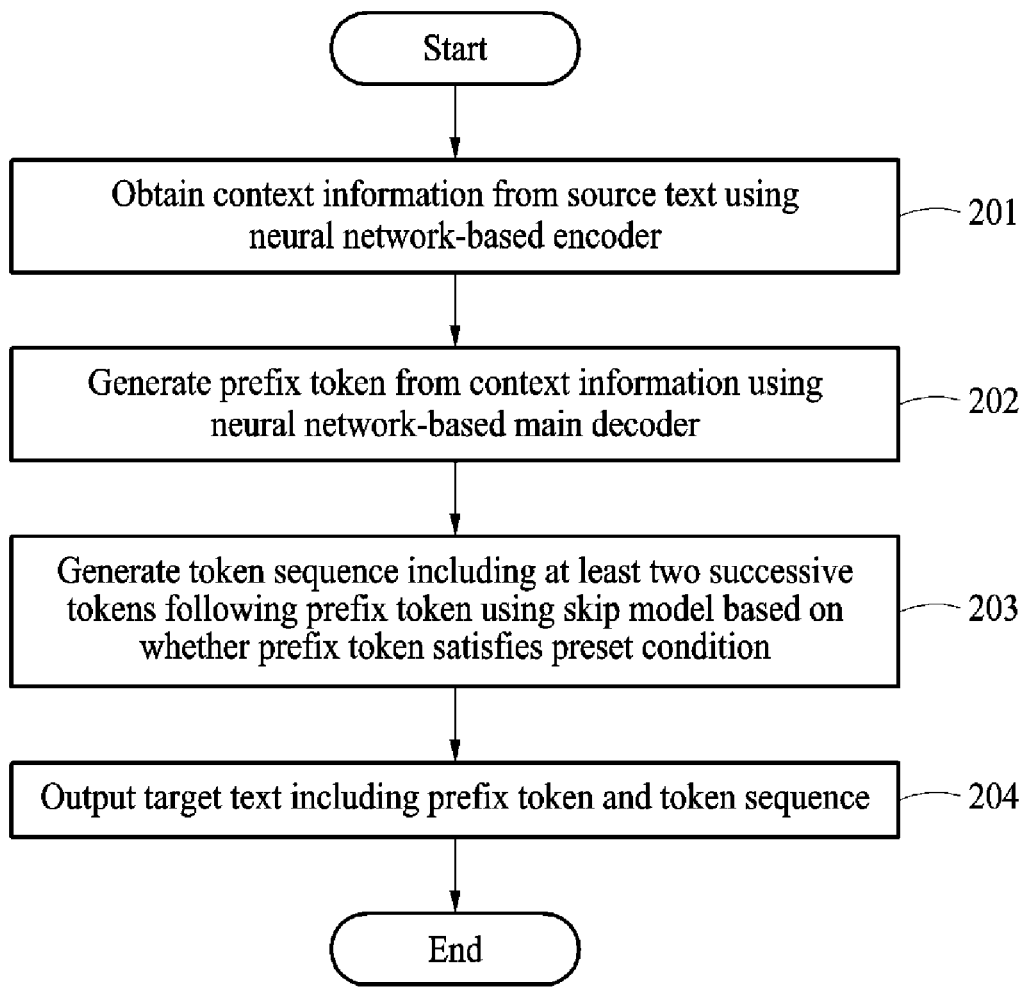
FIG. 2 is a flowchart illustrating an example of a language processing method.

FIG. 2 is a flowchart illustrating an example of a language processing method.

In an example, the language processing apparatus 100 may generate context information representing information of a source text using an NRNN-based encoder, and generate a target text from the generated context information using an NRNN-based decoder interacting with a skip model.

Referring to FIG. 2, in operation 201, the language processing apparatus 100 obtains context information from a source text using a neural network-based encoder. The language processing apparatus 100 transforms the source text to the context information, e.g., in a vector form, using the encoder. For example, a vector used herein may be embodied as a probability value corresponding to each of plural available tokens in the source text. The source text may be sequential data, and thus the context information may also be sequential data.

In operation 202, the language processing apparatus 100 generates a prefix token from the context information using a neural network-based main decoder. The prefix token is used as a term to distinguish it from a following token, and also referred to as a current token. The language processing apparatus 100 sequentially decodes probability values of the context information. The prefix token also refers to a token selected from probability values decoded up to a present.

The language processing apparatus 100 determines whether to perform bulk decoding using the skip model based on a preset condition. The language processing apparatus 100 determines whether to perform the bulk decoding, using the skip model, on an incomplete target text generated using the main decoder. For example, if the target text would eventually be generated as 'nurture', the incomplete target text may be 'nurt'.

Herein, the preset condition may vary based on a type of example skip model implemented. For example, in a case of the skip model being a dictionary, the preset condition may indicate a condition that a probability of a token sequence including at least two successive tokens following the prefix token is greater than or equal to a threshold value. For another example, in a case of the skip model being a neural network, the preset condition may indicate a condition that a degree of difficulty of generating a token sequence following the prefix token is less than or equal to a threshold value.

In operation 203, in response to the prefix token satisfying the preset condition, the language processing apparatus 100 generates a token sequence including at least two successive tokens following the prefix token using the skip model. When the bulk decoding is performed, the language processing apparatus 100 simultaneously generates plural tokens following the incomplete target text and transfers or inputs, to the main decoder, a result of the combining of the generated tokens and the incomplete target text. The main decoder may then proceed with the decoding operation based on the newly transferred/input combined tokens. By generating the token sequence at once by the skip model, the language processing apparatus 100 may thus not need to perform decoding for each token by the main decoder.

In operation 204, the language processing apparatus 100 outputs a target text based on the combination of the prefix token and the token sequence. The skip model used to generate the token sequence may be generated based on a corpus of the target language, and thus may output a more accurate target text compared to if the main decoder performed the sequential decoding for each token.

In response to the prefix token not satisfying the preset condition, the main decoder of the language processing apparatus 100 merely generates a token following the prefix token, such as accordance with the aforementioned non-recurrent only neural network decoder example. If no preset condition is met for subsequent prefix tokens, then the resultant generated target text may thus be the same as if the example non-recurrent only neural network decoder decoded the same context information.

Operations 201 through 204 described above may be performed repetitively until a token indicating an end of a text, for example, <End>, is generated, e.g., with such prefix token condition determinations being made for one or more tokens generated during the decoding process of the main decoder of the language processing apparatus 100. As also noted above, while the token sequence may be generated by the skip model when one of such prefix token condition determinations satisfies the preset condition, if the <End> token has not yet been generated the main decoder may continue to perform decoding of the remaining tokens to generate the target sentence, also noting that if another prefix token condition determination satisfies the preset condition, the skip model may again be respectively utilized to bulk decode one or more additional token sequences prior to the completion of the generation of the target text.

Figure 3A:
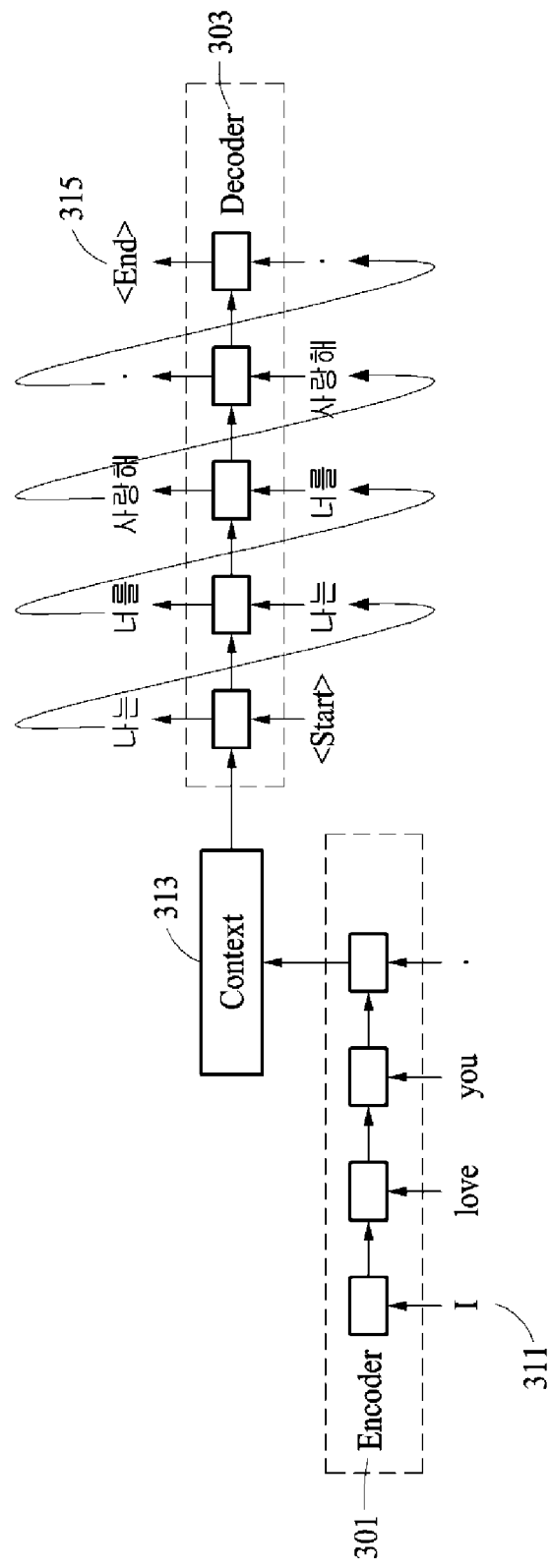
FIG. 3A is a diagram illustrating an example of a language processing method using a recurrent neural network (RNN).

FIG. 3A is a diagram illustrating an example of a language processing method using an RNN.

Referring to FIG. 3A, an RNN-based encoder 301 receives a source text 311, which is sequential data, for example, "I love you." as illustrated. The encoder 301 generates context information 313 from the source text 311. The encoder 301 is an RNN, and thus a hidden state of each hidden node needs to be transferred as an input to a next hidden node. Thus, an encoding process is performed, in sequential order, on each of tokens of the source text 311 "I love you." Herein, the context information 313 may be a vector indicating information of the source text 311, where a unit of a token is a word.

An RNN-based decoder 303 generates a target text 315, for example, "나는 너를 사랑해." as illustrated, from the context information 313. The decoder 303 is an RNN, and thus a hidden state of each hidden node needs to be transferred as an input to a next hidden node. Thus, a decoding process is performed, in sequential order, on each of tokens of the context information 313. Thus, the decoding process is sequentially performed for each token, so each token is sequentially and separately generated.

For example, as illustrated, when a start token <Start> is input to a first hidden node, a hidden state of the first hidden node is updated and "나는" is generated. The updated hidden state of the first hidden node and "나는" are input to a second hidden node, and "너를" is generated. A hidden state of the second hidden node and "너를" are input to a third hidden node, and "사랑해." is generated. A hidden state of the third hidden node and "사랑해." are input to a fourth hidden node, and "." is generated. A hidden state of the fourth hidden node and "." are input to a fifth hidden node, and an end token <End> indicating an end is generated.

Figure 3B:
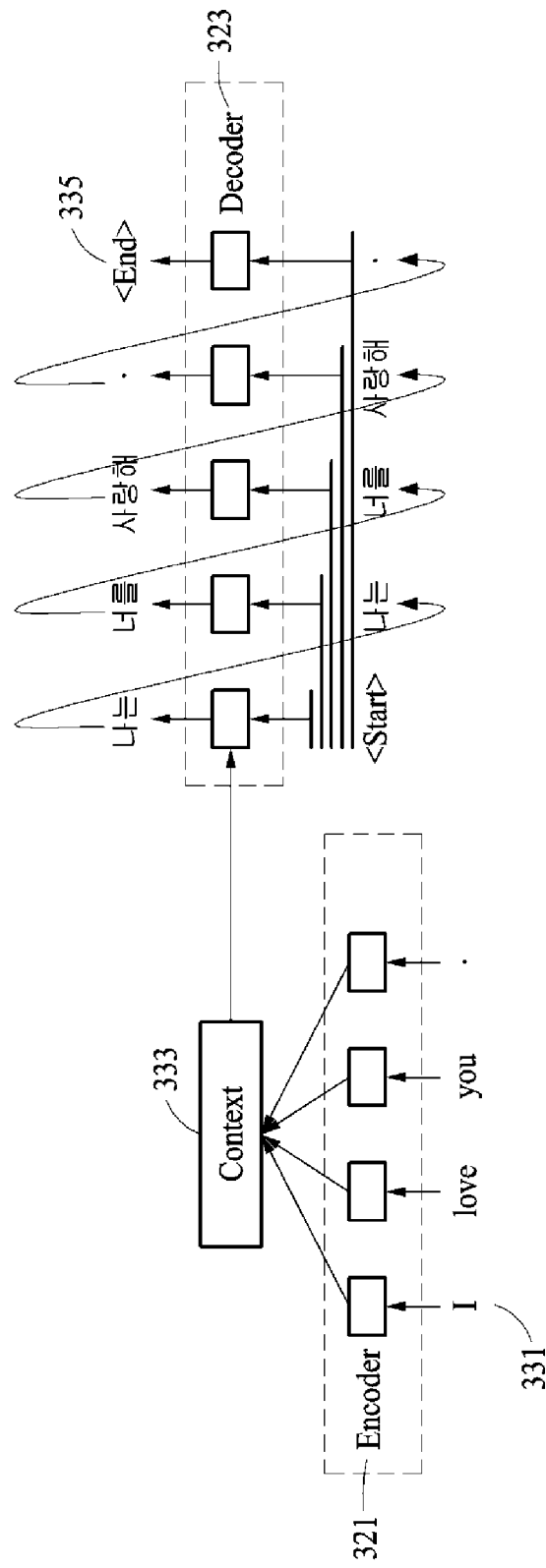
FIG. 3B is a diagram illustrating an example of a language processing method using a neural network other than recurrent neural network (RNN).

FIG. 3B is a diagram illustrating an example of a language processing method using a neural network other than RNN.

Referring to FIG. 3B, an NRNN-based encoder 321 receives a source text 331, which is sequential data, for example, "I love you." as illustrated. The encoder 321 generates context information 333 from the source text 331. The encoder 321 is an NRNN, and thus a hidden state of each hidden node may not be transferred as an input to a next hidden node. Thus, an encoding process is performed on the source text 331 at once without being performed on each of tokens of the source text 331 "I love you." in sequential order.

An NRNN-based decoder 323 generates a target text 335, for example, "나는 너를 사랑해 ." as illustrated, from the context information 333. During inferring operations, each of tokens of the target text 335 is not known in advance, and thus a decoding process may be performed on each of tokens of the context information 333 in sequential order. However, unlike in an RNN-based decoder, the generated tokens are accumulated and the accumulated tokens are then input to a hidden node corresponding to each next generated token.

For example, as illustrated, when a start token <Start> is input to a first hidden node, a hidden state of the first hidden node is updated and "나는" is generated. <Start> and "나는" are input to a second hidden node, and "너를" is generated. <Start>, "나는" and "너를" are input to a third hidden node, and "사랑해." is generated. <Start>, "나는," "너를," and "사랑해." are input to a fourth hidden node, and "." is generated. <Start>, "나는," "너를," "사랑해.," and "." are input to a fifth hidden node, and an end token <End> indicating an end is generated.

FIG. 4 is a diagram illustrating an example of a language processing method using an NRNN along with a skip model.

Referring to FIG. 4, a skip model may be a dictionary 445. For example, the skip model may include the dictionary 445 in which plural words are arranged in alphabetical order. Each of the words in the dictionary 445 may be stored along with information indicating a number of characters that are different when compared to a next word in the dictionary. For example, referring to Table 1 below, words are arranged in an order of "nurse," "nurture," and "nurzhan," the word "nurse" differs from the word "nurture" by two characters based on the word itself "nurse." In addition, the word "nurture" differs from the word "nurzhan" by four characters based on the word itself "nurture." The word "nurzhan" will then differ from the next word in the dictionary by a corresponding number of characters.

TABLE 1

| Word | Skip count |
|---|---|
| . . . | . . . |
| nurse | 2 |
| nurture | 4 |
| nurzhan | ? |
| . . . | . . . |

The language processing apparatus 100 may determine from the dictionary 445 that a word having a prefix token "nurt" can only correspond to "nurture," based on a determination that $Pr(u,r,e|n,u,r,t)=1$, e.g., based on a determined complexity of log time of a number of words included in the dictionary 445. Here, in this skip model dictionary example, there may be a case in which there is only one word having the determined prefix token in the dictionary 445, such as where the probability is 1. However, in other examples, there may also be situations in which there are multiple words including the prefix. In such examples, based on a determined frequency of use of words in sentences (e.g., general sentences), if there is a word having a corresponding value greater than a certain threshold value among the multiple words, the word with the determined greatest frequency of use may be used. That is, in an example, a probability of generating successive plural tokens at once may be determined based on a frequency of use of each word in general sentences in the case of the skip model dictionary.

As illustrated, an NRNN-based encoder 441 receives a source text 451, which is sequential data, for example, "키우고 베풀어 주신 어머니." The encoder 441 generates context information 453 from the source text 451. The encoder 441 is an NRNN, and thus a hidden state of each hidden node may not be transferred as an input to a next hidden node. Thus, an encoding process is performed at once on the source text 451 without being performed on each of tokens of the source text 451 "키우고 베풀어 주신 어머니" in sequential order. In an alternate example, the encoder may be an RNN or BRNN that generates such context information.

An NRNN-based main decoder 443 generates a target text 455, for example, "nurture and . . . ," from the context information 453. During an inferring operation, the tokens of the target text 455 are not known in advance, and thus a decoding process may be performed on each of tokens of the context information 453 in sequential order, depending on whether the skip model is selectively implemented to provide bulk decoding during the decoding process. However, unlike in an RNN-based decoder, each token is accumulated and input to a hidden node corresponding to each token, such as in the non-recurrent neural network example of FIG. 3B.

The language processing apparatus 100 determines whether to perform bulk decoding 457 using the skip model based on a preset condition. For example, after the main decoder 443 decodes one or more tokens, but before inputting the generated token(s) again to the main decoder 443, the language processing apparatus 100 verifies whether there is a token sequence whose probability of being generated subsequently to a token generated in the skip model is greater than or equal to a threshold value, based on a generated prefix token.

Herein, the preset condition may include a condition that such a probability of a token sequence (u, r, e) following a prefix token (n, u, r, t) is greater than or equal to a threshold value. The threshold value may be 1 as illustrated in FIG. 4, and satisfying the condition indicates that, when the prefix token is determined to be (n, u, r, t), a following token sequence may only be (u, r, e). As noted above, alternative examples also exist where the threshold is less than one, and multiple token sequences may be available for selection, such as based on additional information in the example dictionary 445. Herein, a token is a single character unit, noting that the prefix token may be a single character unit or plural character units. Thus, through the satisfying of this condition, the skip model may provide the token sequence (u, r, e) back to the main decoder 443, e.g., for input to a hidden node of the main decoder 443, for further decoding processing. Here, this provision of the token sequence may be understood to enable the main decoder 443 to skip otherwise implemented sequential decoding operations, e.g., as would have otherwise been performed if the condition was not satisfied, for the corresponding tokens of the token sequence, e.g., thereby enabling the main decoder to perform bulk decoding of provided context information. For example, FIG. 4 demonstrates through the dashed portion of the main decoder 443 operations the sequential decoding operations for the respective u, r, and e tokens that may have otherwise been performed by the main decoder 443 if the condition had not been satisfied.

As illustrated, a start token <Start> is input to a first hidden node, and "n" is generated. <Start> and "n" are input to a second hidden node, and "u" is generated. <Start>, "n," and "u" are input to a third hidden node, and "r" is generated. <Start>, "n," "u," and "r" are input to a fourth hidden node, and "t" is generated. Before a token is input to a next hidden node, the language processing apparatus 100 verifies whether a token sequence with a probability greater than or equal to the threshold value is present in the dictionary 445. Herein, an n-th hidden node refers to a hidden node at which an n-th token is processed, and a single hidden node may be used iteratively.

When a probability of "nurture" corresponding to the prefix token (n, u, r, t) is greater than or equal to the threshold value, the skip model, in lieu of the dashed illustrated fifth hidden node, receives the prefix token (n, u, r, t) and generates the token sequence (u, r, e) at once. The main decoder 443 thus next uses, as an input, Start>, "n," "u," "r", "t" in combination with "u, r, e" generated in the skip model after the generating of "t," i.e., without the main decoder 443 otherwise sequentially generating tokens in order of "t," "u," "r," and "e" if the condition had not been satisfied. As described above, the main decoder 443 generates the target text 455 by omitting or skipping three decoding steps or processes on "u," "r," and "e."

As described, a number of decoding steps or processes may be reduced, while accuracy in translation may also be improved. For example, in a case in which decoding is performed for each character, or by a character unit, for a text generation such as by the non-RNN or NRNN decoder examples of FIG. 3A or 3B, an incorrect character may occur in the resultant generated text, meaning that the accuracy is decreased or lower with such decoder examples. For example, "nurtuxe" may be generated in lieu of "nurture." However, in the above example of FIG. 4, because the skip model is or includes a predetermined dictionary with predetermined character sequences or words in the target language, the language processing apparatus 100 may immediately generate the correct "nurture" text result using the skip model, and thus may achieve an increased accuracy in translation without an error.

Figure 5:
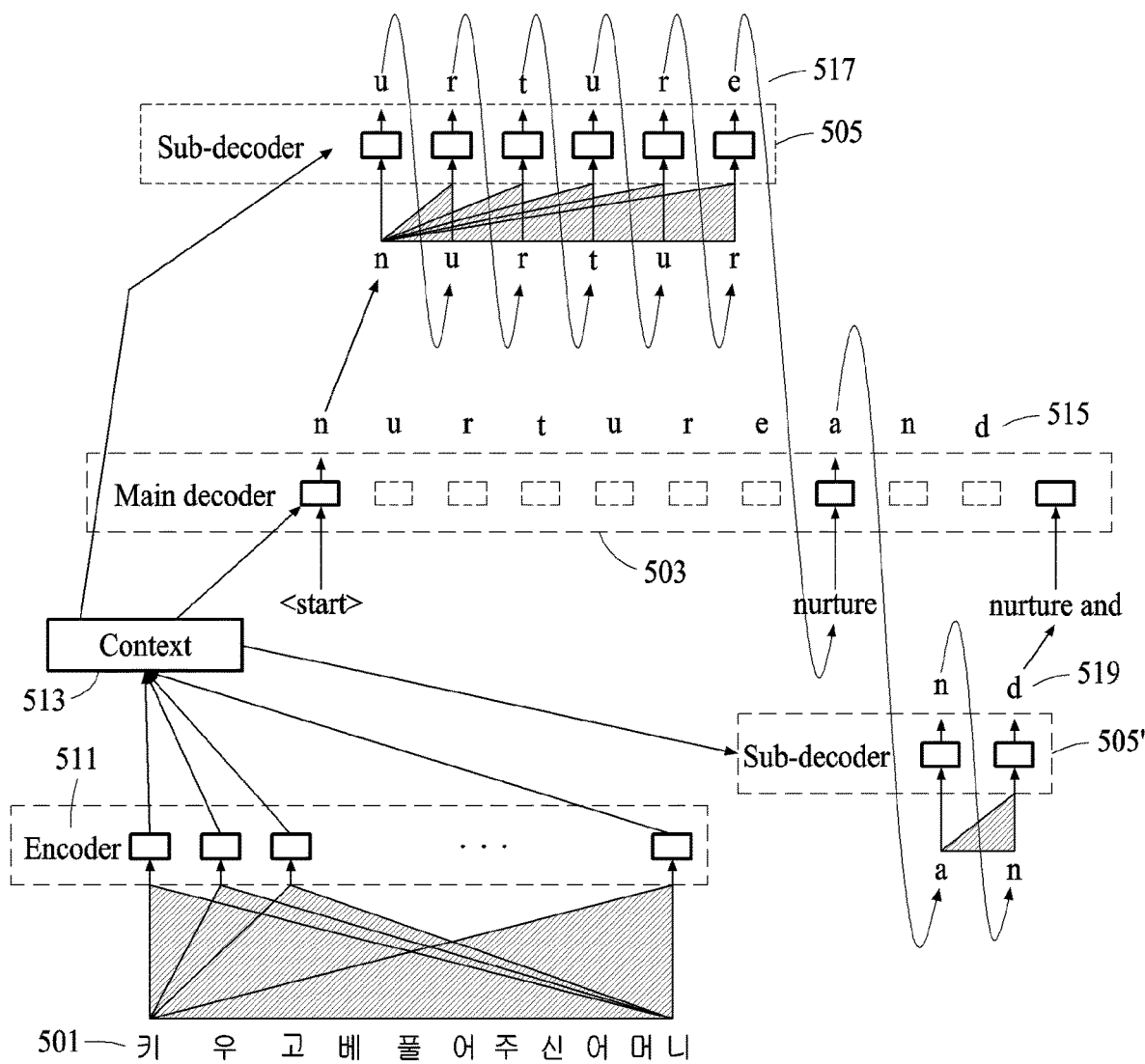
FIG. 5 is a diagram illustrating an example of a language processing method using an NRNN along with a skip model.

FIG. 5 is a diagram illustrating another example of a language processing method using an NRNN along with a skip model.

Referring to FIG. 5, a skip model includes a neural network-based sub-decoder 505. The language processing apparatus 100 may generate a token sequence using the sub-decoder 505 configured to generate a token sequence relatively faster than a main decoder under a condition that a degree of difficulty of generating the token sequence by the skip model is less than or equal to a threshold value.

An NRNN-based encoder 511 receives a source text 501, which is sequential data, for example, "키우고 베풀어 주신 어머니." The encoder 511 generates context information 513 from the source text 501. The encoder 511 is an NRNN, and thus a hidden state of each hidden node may not be transferred as an input to a next hidden node. Thus, an encoding process may be performed at once on the source text 501 without being performed on each of tokens of the source text 501 "키우고 베풀어 주신 어머니."

An NRNN-based main decoder 503 generates a target text, for example, "nurture and . . . ," from the context information 513. Herein, during the inferring operations each of the tokens of the target text is not known in advance, and thus the decoding process may be performed on each of tokens of the context information 513 in sequential order, depending on whether the skip model is selectively implemented to provide bulk decoding during the decoding process.

The language processing apparatus 100 determines whether to perform the bulk decoding using the skip model based on a preset condition. Before inputting a token generated from the main decoder 503 to the main decoder 503 again, the language processing apparatus 100 verifies whether there is a token sequence to be generated subsequently to a generated prefix token and having a degree of difficulty of generating the token sequence that is less than or equal to the threshold value based on the prefix token. In the sub-decoder skip model example, the degree of difficulty may be low when entropy of the token sequence to be generated subsequently based on the generated prefix token is low. In an example, the entropy may be calculated based on a determined frequency of use in general sentences with respect to the generated prefix token and one or more token sequences to be generated subsequently, such as discussed above with respect to the skip model dictionary. In addition, to generate plural token sequences at once using the sub-decoder, token sequences that maximize respective probabilistic likelihood values may be generated, and the respective entropies (the degrees of difficulty) may be calculated based on the likelihood values. Still further, such degrees of difficulty determinations may be performed with or without implementing the sub-decoder slip model. For example, the determination of the degree of difficulty may be performed in advance only using the prefix token, and thus, by comparing the determined degree of difficulty to the preset condition, whether to implement the sub-decoder skip model may be determined.

As illustrated, a start token <Start> is input to a first hidden node, and "n" is generated. For example, the language processing apparatus 100 may verify that a degree of difficulty of generating a token sequence to be generated subsequently to "n" is less than or equal to the threshold value, before the generated token "n" is input to the main decoder 503 again. Instead of inputting <Start> and "n" to a second hidden node of the main decoder 503, the language processing apparatus 100 performs decoding using the sub-decoder 505. Herein, the sub-decoder 505 may generate a target text relatively faster than the main decoder 503. For example, less than all previous generated decoded tokens may be input to the sub-decoder 505, and thus sub-decoder 505 may decode context information faster than if the main decoder 503 performed the same decoding. As another example, the sub-decoder 505 (and/or sub-decoder 505') may include less hidden layers, nodes, and/or connections weights than the main decoder 503, and thus be smaller than the main decoder 503. The sub-decoder(s) or various selectable sub-decoders, for example, may also be respectively trained by being optimized for a certain type of prefix, and thus perform decoding faster and more accurately than the main decoder 504. However, in such an example a particular sub-decoder may have a narrower range of types of processible inputs than the main decoder 503.

As noted above, the speed of the sub-decoder may be proportional to the size of the neural network (e.g., the number of layers, nodes, and/or connection weights). In general, larger neural networks may be utilized for greater the degree of difficulty desired tasks, and thus if a most difficult task is utilized with the most complex and greatest sized neural network, there the task may be accomplished but at substantial cost of time, processing resources, etc. Thus, although the difficulty of a respective task may not be quantitatively calculated for each inquiry, determining a postfix based on a prefix of a sequence using the example sub-decoders 505 and 505' may substantially reduce such costs when a sufficient prefix is determined and provided to such a sub-decoder.

Thus, in this example, "n" is input to a first hidden node of the sub-decoder 505, and "u" is generated. "n" and "u" are input to a second hidden node, and "r" is generated. "n," "u," and "r" are input to a third hidden node, and "t" is generated. "n," "u," "r," and "t" are input to a fourth hidden node, and "u" is generated. "n," "u," "r," "t," and "u" are input to a fifth hidden node, and "r" is generated. "n," "u," "r," "t," "u," and "r" are input to a sixth hidden node, and "e" is generated. Thus, in this example, the sub-decoder 505 may generate "nurture," a token sequence 517, relatively faster than if the main decoder 503 had performed decoding of the context information to generate the same token sequence.

Thereafter, "nurture" is input to the main decoder 503, i.e., sequentially after "n" was generated by the first hidden node of the main decoder 503. Before inputting the generated token sequence "nurture" to the main decoder 503, the language processing apparatus 100 may again perform the degree of difficulty verification, and may verify that a degree of difficulty of generating a token sequence subsequently to "nurture" is greater than the threshold value. Because the degree of difficulty is greater than the threshold for "nurture", the main decoder 503 generates "a."

Then, before inputting the generated token sequence "nurture a" to the main decoder 503, the language processing apparatus 100 again performs the degree of difficulty verification, and may verify that a degree of difficulty of generating a token sequence subsequently to "nurture a" is less than or equal to the threshold value. Because the degree of difficulty is less than or equal to the threshold for "nurture", the language processing apparatus 100 performs decoding using the sub-decoder 505'. Here, the sub-decoder 505' may be a different sub-decoder or the same sub-decoder as the sub-decoder 505.

Thus, "a" is input to the first hidden node of the sub-decoder 505', and "n" is generated. "a" and "n" are input to a second hidden node, and "d" is generated. The sub-decoder 505' may generate "and," a token sequence 519, relatively faster than the main decoder 503. For example, the sub-decoder 505' may generate the token sequence 519 based on less input token information of previous token generations by the main decoder 503 or the previous token sequence generations by the sub-decoder 505. The language processing apparatus 100 then generates "nurture and" by combining "nuture" with the token sequence 519, and inputs "nuture and" to the main decoder 503 for further decoding processing. Thus, similar to FIG. 4, FIG. 5 also demonstrates through dashed decoding operations of the main decoder 503 those decoding operations that were skipped through the selected alternative respective bulk decodings by the sub-decoder 505 and sub-decoder 505', and thus also represent in the alternative how the main decoder 503 would have sequentially decoded each of the corresponding tokens if such verification operations had failed to indicate to perform the example bulk decoding operations with respect to "n" and with respect to "nurture a" by the sub-decoder 505 and sub-decoder 505'.

In an example, the sub-decoders 505 and/or 505' may be trained in parallel with, e.g., together with or dependent on, the training of the main decoder 503, or any or all of the sub-decoders may be trained independently of the main decoder 503. Similarly, in an example, with respect to the dictionary 455 of FIG. 4, the dictionary 455 may also be derived independently of the main decoder, or based on the training data used in the training of the main decoder, as non-limiting examples.

Figure 6A:
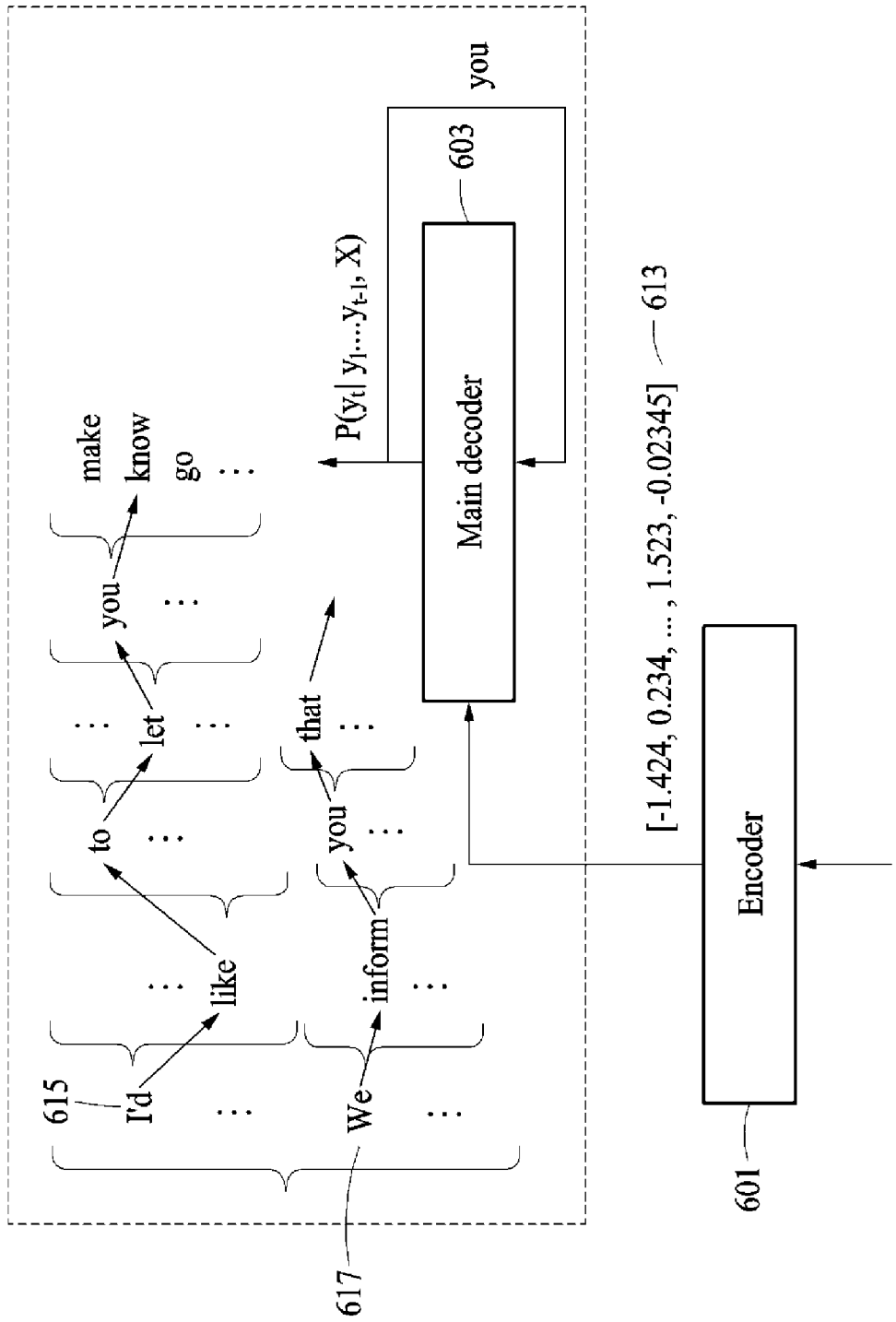
FIG. 6A is a diagram illustrating an example of a language processing method using an NRNN along with a beam search algorithm.

FIG. 6A is a diagram illustrating an example of a language processing method using an NRNN along with a beam search algorithm.

Referring to FIG. 6A, the language processing apparatus 100 performs language processing for each beam while maintaining plural beams. By performing a plurality of language processing processes, the language processing apparatus 100 may obtain more diversified candidate texts, and generate a more accurate target text.

In an example, the language processing apparatus 100 may generate a prefix token for each of a preset number of beam nodes, and selectively generate a token sequence using any of the aforementioned skip models for each of the beam nodes, e.g. based on the corresponding conditions being met for such skip model implementations. The language processing apparatus 100 may determine a target text among candidate texts including the prefix token and the token sequence obtained for each of the beam nodes.

For example, as illustrated, the language processing apparatus 100 inputs, to an encoder 601, a source text 611 "귀하의 직무발명이 출원되었음을 알려 드립니다." The encoder 601 generates, as context information 613, a vector indicating information of the source text 611, for example, [−1.424, 0.234, . . . , 1.523, −0.02345] as illustrated.

A main decoder 603 receives the context information 613 for each of two beams 615 and 617 and generates plural candidate texts for each of the beams 615 and 617. The language processing apparatus 100 calculates a probability of each of plural incomplete candidate texts generated in each of the beams 615 and 617 each predetermined number of times, and selects two candidate texts having determined greatest probabilities and allocates the selected candidate texts to the beams 615 and 617, respectively. The language processing apparatus 100 generates plural candidate texts in which a token following each of the candidate texts selected through the skip model for the beams 615 and 617 is combined. The language processing apparatus 100 repeats such a process described in the foregoing until the language processing apparatus 100 outputs a final target text.

The main decoder 603 determines whether each token in each beam satisfies the preset condition. In a case in which the skip model being a dictionary, the preset condition may be a condition that, when a prefix token is $y_1, \ldots, y_{t-1}$, and a probability of a token sequence being $y_t$ is greater than or equal to X, then skip model is used to estimate or decode the sequence being $y_t$. For example, in the beam 617, when "We inform y" is a prefix token and a probability of a token sequence being "you" is greater than or equal to X, "you" may be generated immediately by the skip model and decoding continued using "We inform you" as a candidate text. In an example, the respective skip model implementations for the different beams may be independently performed, as well as being performed in parallel.

FIG. 6B is a diagram illustrating an example of a language processing method using a dictionary of a skip model and an NRNN along with a beam search algorithm.

Referring to FIG. 6B, the language processing apparatus 100 receives a source text 631 "키우고 베풀어 주신 어머니" using an encoder 621. The encoder 621 transforms the source text 631 to context information 633.

The language processing apparatus 100 performs language processing on each of two beams 623 and 625. The language processing apparatus 100 generates candidate texts 635 ("nurse") and 637 ("nuture") for the beams 623 and 625, respectively, from the context information 633. Herein, the language processing apparatus 100 may reduce an amount of time used to generate the candidate texts 635 and 637 by respectively using the skip model to produce different token sequences.

For example, as illustrated, the language processing apparatus 100 generates a token sequence immediately at once using the skip model because, when a prefix token is partially decoded as n, u, r in the beam 623, a determined probability 0.6 of a following token sequence being s, e is determined greater than or equal to a preset threshold value 0.09. Similarly, the language processing apparatus 100 may also generate a token sequence immediately at once using the skip model because, when a prefix token is partially decoded as n, u, r in the beam 625, a determined probability 0.1 of a following token sequence being t, u, r, e is determined greater than or equal to the threshold value 0.09. Herein, in an example, the skip model may still be implemented even when the determined degree of difficulty for generating a token sequence is equal to or greater than a degree of difficulty of the main decoder if the main decoder were to determine the token sequence from the prefix token, such as when the use of the skip model may still result in quicker token sequence determinations than the same token sequence being determined by the main decoder. For example, in the case of sequential modeling-based language models, when the length of a sequence is reduced, such as with respect of the implemented skip model, the number of iterations of the model may be reduced and the speed may thus be improved in the skip model implementation for the generating of the token sequence compared to a main decoder implementation to generate the same token sequence.

For example, as illustrated, the language processing apparatus 100 verifies or determines that probabilities of two initial tokens of "nurse" are 0.2 and 0.4 using a dictionary 641. The language processing apparatus 100 verifies or determines that probabilities of two initial tokens of "nurture" are 0.03 and 0.06 using the dictionary 641. However, in a case in which the language processing is performed in a single beam, only "nurse" may have been generated as a candidate text because the probabilities of the two initial tokens of "nurse" are greater.

However, because the language processing apparatus 100 may perform the language processing while maintaining at least two beams using a beam table 643, a more accurate decoding may be performed. For example, as illustrated, the language processing apparatus 100 performs the language processing while maintaining "nurse" and "nurture" in respective beams, e.g., through independent and parallel beams with respective skip model determinations and implementations. The language processing apparatus 100 then finally verifies or determines that a probability of "nurse" is 0.02 and that a probability of "nurture" is 0.72. Herein, as another example when there are three beams, the language processing apparatus 100 may verify or determine that a probability of "nurt" is 0.63.

The language processing apparatus 100 then verifies that the final probability of "nurture" is determined greatest. As described above, the language processing apparatus 100 may perform a plurality of language processing processes with different token sequence generation for a skip model implementation through multiple beams, and thus generate a target text having a greater probability of the target text being a correct answer.

Figure 6C:
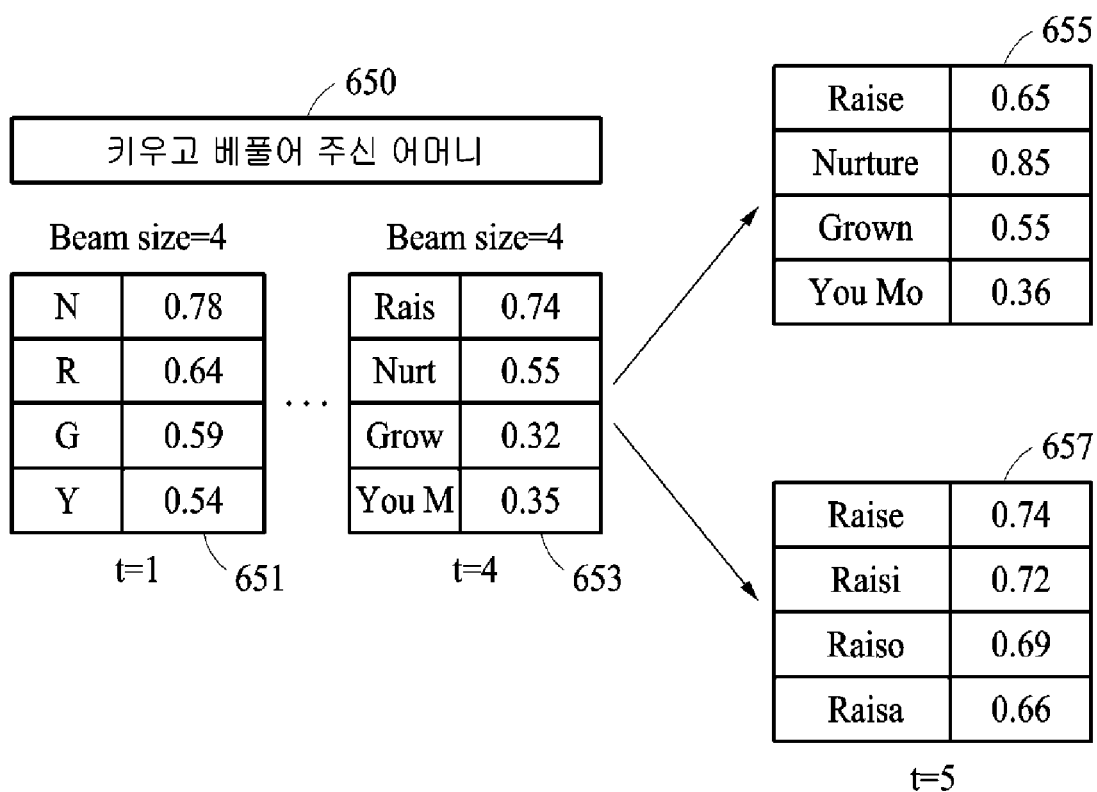
FIG. 6C is a diagram illustrating an example of a result obtained through a language processing method using a beam search algorithm.

FIG. 6C is a diagram illustrating an example of a result obtained through a language processing method using a beam search algorithm.

Referring to FIG. 6C, the language processing apparatus 100 finally determines, to be a target text, a candidate text having a determined greatest probability while maintaining a plurality of incomplete candidate texts.

For example, as illustrated, when context information associated with a source text 650 "키우고 베풀어 주신 어머니" is input to a decoder, a decoding process is performed on each of four beams. Herein, the four beams are maintained although a token "N" has a determined greatest probability of 0.78 in a first token table 651, and thus top four tokens "N," "R," "G," and "Y" are stored in the first token table 651. Subsequently, after several respective sequential decodings, in a corresponding fourth token table 653, an incomplete candidate text "Rais" has a determined greatest probability of 0.74.

Herein, if only one beam is maintained in the fourth token table 653, only "Rais" may be used as a prefix token for plural token sequence generations using the skip model, with results being shown in an alternate fifth token table 657. However, when more than one or when all the four beams are maintained, the corresponding or all of "Rais," "Nurt,"

"Grow," and "You M" may be used as a prefix token for corresponding sequence generations using the skip model, with results being shown in a fifth token table 655.

Based on a determined final probability, "Nurture" is generated with a determined greatest probability of 0.85 in the fifth token table 655. Also, "Raise" is generated with a determined greatest probability of 0.74 in the alternate fifth token table 657. Thus, since a probability of a highly accurate target text being finally generated increases when a token table has various different, not similar, expressions, the language processing apparatus 100 may output a more accurate target text using such a multiple beam search algorithm.

Figure 7:
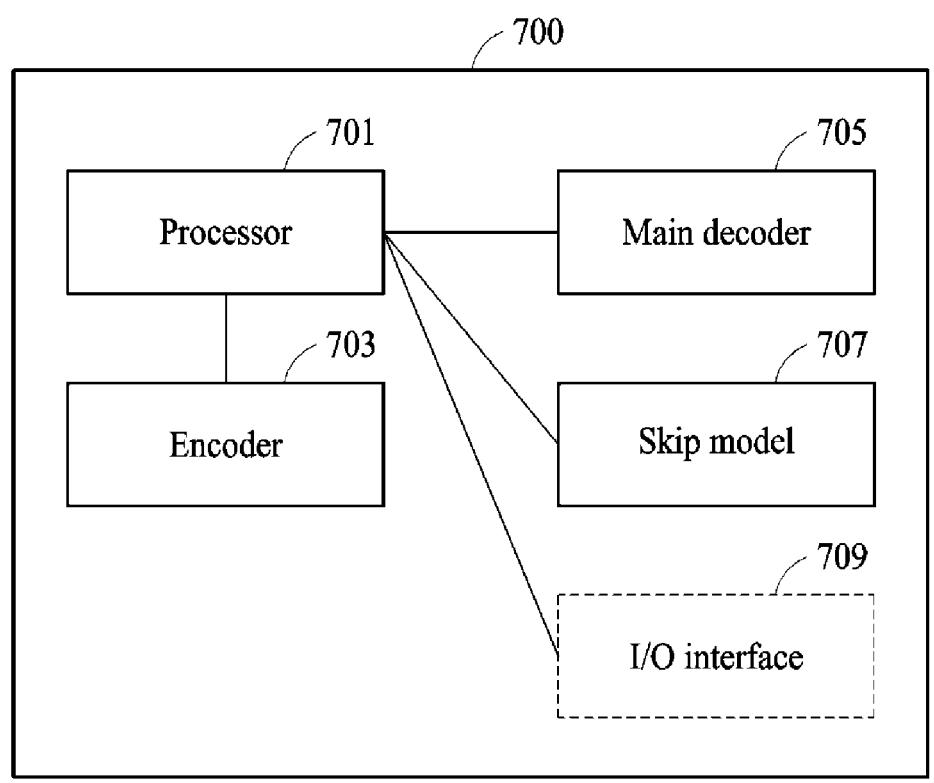
FIG. 7 is a diagram illustrating an example of a language processing apparatus.

FIG. 7 is a diagram illustrating an example of a language processing apparatus.

Referring to FIG. 7, a language processing apparatus 700 includes at least one processor 701, a neural network-based encoder 703, a neural network-based main decoder 705, and a skip model 707 configured to generate a token sequence including at least two successive tokens. In an example, language processing apparatus 700 may be a neuromorphic chip, which refers to a chip embodied by a circuit configured to perform such neural network operations. In an example, the processor 701 may correspond to such a neuromorphic chip or circuit. The language processing apparatus 700 may further include an input and output (I/O) interface 709. Each of the encoder 703 and the main decoder 705 may be an NRNN. For example, the processor 701 may respectively be configured as, or to include or implement, each of the encoder 703, the main decoder 705, and/or the skip model 707, such as by loading the corresponding trained parameters of the respective NRNNs of the encoder 703 and the main decoder 705, or non-recurrent neural network portions of a translator model neural network that includes both the encoder 703 and the main decoder 705, and/or by loading the skip model dictionary or skip model neural network parameters, and implementing the respectively loaded parameters and performing any or any combination of such training, inferring, encoding, decoding, selective bulk decoding, and corresponding beam search operations described above. In another example, as the processor 701 is representative of one or more processors, the encoder 703 may be implemented by a first processor and the main decoder 705 may be implemented by another processor, and the skip model 707 may be implemented by still another processor, or any combination of the encoder 703, main decoder 705, and skip model 707 may be implemented by any combination of one or more processors.

The processor 701 generates context information from a source text using the encoder 703. In a case of the encoder 703 being an NRNN, the processor 701 may generate the context information by performing parallel encoding on the source text. In an example, the processor 701 may also perform a recognition operation in the source language to generate the source text.

The processor 701 generates a prefix token from the context information using the main decoder 705. Despite the main decoder 705 being an example NRNN, during inferring operations the target text is not known in advance, and thus tokens to be included in the target text are generated in sequential order when generated by the main decoder 705.

In response to the prefix token satisfying a preset condition, the processor 701 generates a token sequence following the prefix token using the skip model 707, and thus may perform bulk decoding to generate the token sequence. The skip model 707 may include a dictionary in which plural words are arranged in alphabetical order, along with information indicating the relatedness of each word to other words in the dictionary. The skip model 707 may include a neural network-based sub-decoder which may be trained to generate such token sequences for an input prefix token. Thus, a token sequence including plural tokens may be generated at once by the skip model, and thus a number of decoding processes of the main decoder 705 may be reduced or skipped. The processor 701 outputs the target text in which the prefix token and the token sequence have been combined.

In response to the prefix token not satisfying the preset condition, the processor 701 generates a token following the prefix token using the main decoder 705. Herein, a same result that may be obtained from decoding by a non-recurrent only neural network decoder without use of the skip model 707 may thus be generated, though the processing will take longer than the skip model implemented decoding because the required sequential token decoding of the non-recurrent only neural network decoder.

Figure 8:
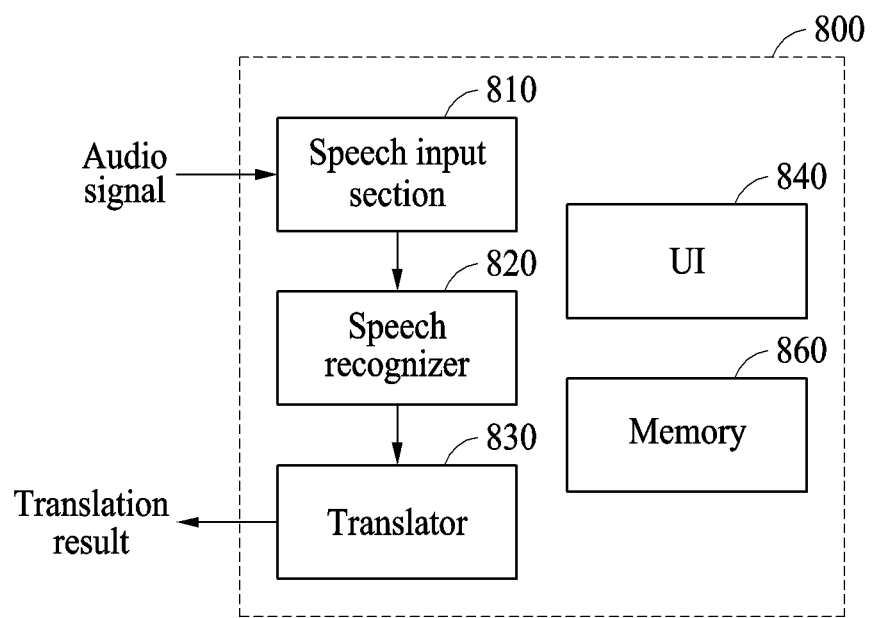
FIG. 8 is a block diagram of an example electronic device.

FIG. 8 is a block diagram of an example electronic device 800.

Referring to FIG. 8, the electronic device 800 may include a speech input section 810, a speech recognizer 820, and a translator 830. For example, the speech input section 810 may include a microphone, be operable in connection with or in response to such a microphone of the user interface (UI) 840, or may be part of the UI 840. The speech input section 810 may additionally or alternatively include a camera or a memory storing captured image data of text information. In one or more embodiments, the speech recognizer 820 may include one or more processors, for example.

The speech input section 810 may receive a user's audio signal that is input through the microphone. In one or more embodiments, the user's audio signal may be related to sentences to be translated into another language or commands for controlling a TV set, driving a vehicle, intelligent speech/conversation, or the like and only as examples.

Thus, one or more acoustic and/or language models of the speech recognizer 820 may be respectively trained and used to model different source languages. In an example, the speech recognizer 820 may also convert an analog audio signal input to the speech input section 810 by a user into a digital signal, and may divide the signal into a plurality of speech frames. The speech recognizer 820 may output a speech recognition result in a text format, e.g., as the source sentence in the corresponding source language, by recognizing a user's speech by using acoustic and language scores obtained by the respective acoustic and language models implemented by the speech recognizer 820.

The translator 830 may correspond to any of the language processing apparatuses described herein, the processor 701, the language processing apparatus 700 of FIG. 7, or remote processor or servers, for example, and may perform any of the above operations described with respect to encoding of the source sentence, decoding of the target sentence, and/or selective bulk decoding for corresponding context information by implementing any of the skip models described herein with respect to FIGS. 2-7. Here, though illustrated separately, the speech recognizer 820 may also be implemented by the processor 701 of FIG. 7, or implemented by a separate processor of the electronic device 800.

In addition, the translator 830 may indicate a result of the translation, e.g., the generated target text, either explicitly or implicitly, such as by outputting a corresponding translated sentence, or by performing an operation desired by a user or an answer to a query in response to the translation result. For example, the translator 830 may output the translation result in the target language of speech input by a user in voice in the source language through a speaker represented by the UI 840 and the like, or may provide the translation result in a text format on a display represented by the UI 840. Further, the translator 830 may perform operations to process commands (e.g., power on/off, volume control, etc.) regarding the electronic apparatus 800. In addition, the translator 830 may execute applications installed in the electronic device 800, operate a web browser to browse a website desired by a user, and/or provide results of a translated query. Thus, the translator 830 may translate the source text into the different target language, and may output a translated result in voice or in a text format, or perform or not perform further operations based on the results of the translation. However, the translator 830 is not limited thereto, and may be used in other various applications. Also, herein, though an example source language encoder and target language decoder are discussed with respect to particular examples of a particular source language and particular target language, the electronic device 800 may store in the memory 860 differently trained encoder, decoders, and skip models for various source and target languages and be configured to perform translation of various source languages to one or more various target languages.

The electronic device 800 may be a mobile terminal and/or wearable device. Such a mobile terminal or wearable device has user input and output hardware in the UI 840, representative of a microphone, display/touch screen, physical buttons, speaker, vibration motor, camera, e.g., intercoupled via a communication bus to one or more processors of the electronic device 800 and a memory, such as memory 860. The disclosed examples and operations of FIGS. 1-8 may also be especially useful in wearable devices which generally do not have physical keyboards and only limited display area for user text/command entry, though embodiments may alternatively exist where the UI 840 includes such a physical keyboard and display(s). The UI 840 may correspond to the I/O interface 709 of FIG. 7, for example. In another non-limiting example, any of the speech input section 810, speech recognizer 820, and translator 830, or respective aspects of the same less than all aspects, may be remotely implemented by one or more other or additional processors of one or more other electronic devices 800 in a system example, such as when the system example includes a first electronic device with less than all of the speech input section 810, speech recognizer 820, and translator 830, or some aspects of the same, and a second or other electronic device(s) at least implement some or all of the lacking speech input section 810, speech recognizer 820, and translator 830, or aspects of the same, e.g., with ultimate transmission of results of the same back to the first electronic device for indication or further processing with respect to the remaining aspects.

Still further, the memory 860 may be used to store one or more of the acoustic and language models of the speech recognizer 820, to be used by the speech recognizer 820. The memory 860 may further be used to store the parameters of the herein neural network examples of the encoder, decoder, and skip model and any dictionary skip models used by the translator 830 to perform translation, such as of the parameters defining the encoder 703, main decoder 705, and skip model 707 of FIG. 7. In addition to temporarily and/or permanently store source texts, resulting context information, interim decodings or token generation results, prefix tokens, token sequences, final decoded texts, and respective probability or beam search results, the memory 860 may also store the aforementioned dictionary 445 of FIG. 4, dictionary 641 and beam table 643 of FIG. 6B, and the first through fifth and alternate fifth example token tables 651, 653, 655, and 657 of FIG. 6C, as non-limiting examples. In another example, one electronic device 800, e.g., with at least the speech input section 810, UI 840, speech recognizer 820, and memory 860, and potentially further the translator 830, and may perform capturing and the speech recognition and then use the UI 840 to transmit the generated source text to another electronic device 800, e.g., with at least the memory 860 and translator 830, and potentially further the speech input section 810, UI 840, and speech recognizer 820. Here, the other electronic device may then perform the encoding and decoding, with selective bulk decoding, of the transmitted source text and transmit back to the electronic device 800 the generated target text for the indication of the translation result by the electronic device 800. In this example, the other electronic device 800 may also or alternatively perform the indicating of the translation result.

Thus, as a non-exhaustive example only, the electronic device 800 as described herein may be a mobile device, such as a cellular phone, a smart phone, a wearable smart device (such as a ring, a watch, a pair of glasses, a healthcare device, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, other healthcare device, a mobile robot, a vehicle electronic device, user interface, or controller, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

The language processing apparatuses, encoders, decoders, skip models, processor 701, encoder 703, main decoder 705, skip model 707, I/O interface 709, electronic apparatus 800, speech input section 810, speech recognizer 820, translator 830, UI 840, and memory 860 described herein with respect to FIGS. 1-8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1 through 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method for language processing using a neural network, the method comprising:
    obtaining context information from a source text using a neural network-based encoder;
    generating a prefix token from the context information using a neural network-based main decoder;
    in response to the prefix token satisfying a preset condition, generating a token sequence including at least two successive tokens sequentially following the prefix token using a skip model; and indicating a target text in which the prefix token and the token sequence are combined as an inference result with respect to the source text.

2. The method of claim 1, further comprising inputting the prefix token and the token sequence to the main decoder to sequentially generate one or more tokens sequentially following the token sequence.

3. The method of claim 1, wherein the main decoder is configured to generate tokens sequentially.

4. The method of claim 3, wherein, based on the prefix token satisfying the preset condition and through the generating of the token sequence by the skip model, the main decoder non-sequentially decodes the context information.

5. The method of claim 4, wherein the main decoder generates tokens sequentially, except that when the skip model generates a corresponding token sequence for a corresponding prefix token the main decoder skips decoding of tokens sequentially following the corresponding prefix token by next inputting, sequentially after the generating of the corresponding prefix token, the corresponding prefix token and the corresponding token sequence to the main decoder for decoding processing by the main decoder.

6. The method of claim 3, wherein the main decoder is a non-recurrent neural network.

7. The method of claim 1,
wherein the encoder is trained to perform a vector transformation of the source text in a first language for the obtaining of the context information, and
wherein the main decoder is trained to perform a translation of the context information into probabilistic information with respect to a different second language corresponding to the target text.

8. The method of claim 1, further comprising, in response to the prefix token not satisfying the condition, generating a token sequentially following the prefix token using the main decoder.

9. The method of claim 1, wherein the skip model includes a dictionary in which a plurality of words are arranged in alphabetical order.

10. The method of claim 9, wherein the condition includes a condition that a probability of the token sequence following the prefix token is greater than or equal to a threshold value.

11. The method of claim 1, wherein the skip model includes a neural network-based sub-decoder.

12. The method of claim 11, wherein the condition includes a condition that a degree of difficulty of generating the token sequence by the skip model is less than or equal to a threshold value.

13. The method of claim 12, wherein the sub-decoder includes first hidden nodes and the main decoder includes second hidden nodes,
wherein one or more hidden nodes of the second hidden nodes generates a token of the prefix token,
at least one hidden node of the first hidden nodes is configured to receive the prefix token and one or more hidden nodes of the first hidden nodes generate the token sequence, and
based on whether the prefix token satisfies the preset condition, another hidden node of the second hidden nodes is configured to receive the prefix token and the token sequence.

14. The method of claim 1,
wherein the generating of the prefix token comprises generating a prefix token for each of a preset number of beam nodes, and
wherein the generating of the token sequence comprises generating respective token sequences using the skip model for each of the beam nodes.

15. The method of claim 14, further comprising:
determining the target text from among candidate texts respectively including the prefix token and the generated respective token sequences for each of the beam nodes.

16. The method of claim 1, wherein the skip model includes first hidden nodes and the main decoder includes second hidden nodes,
one or more hidden nodes of the second hidden nodes generate a token of the prefix token,
at least one hidden node of the first hidden nodes is configured to receive the prefix token and one or more hidden nodes of the first hidden nodes generate the token sequence, and
based on whether the prefix token satisfies the preset condition, another hidden node of the second hidden nodes is configured to receive the prefix token and the token sequence.

17. The method of claim 1, wherein the token includes a character, plural characters, a word, or a sentence.

18. The method of claim 1, wherein the target text corresponds to a translation result of the source text.

19. The method of claim 1, wherein the target text is a result of generating a natural language corresponding to the source text.

20. A non-transitory computer-readable storage medium storing instructions that, when executed by a processor, cause the processor to perform the method of claim 1.

21. A language processing apparatus comprising:
one or more processors configured to:
generate context information from a source text using a neural network-based encoder;
generate a prefix token from the context information using a neural network-based main decoder;
in response to the prefix token satisfying a preset condition, generate the token sequence sequentially following the prefix token using a skip model configured to generate a token sequence including at least two successive tokens; and
indicate a target text in which the prefix token and the token sequence are combined as an inference result with respect to the source text.

22. The language processing apparatus of claim 21, wherein the one or more processors are further configured to input the prefix token and the token sequence to the main decoder to sequentially generate one or more tokens sequentially following the token sequence.

23. The language processing apparatus of claim 21, wherein the main decoder is configured to generate tokens sequentially.

24. The language processing apparatus of claim 23, wherein, based on the prefix token satisfying the preset condition and through the generating of the token sequence by the skip model, the main decoder non-sequentially decodes the context information.

25. The language processing apparatus of claim 24, wherein, when the skip model generates a corresponding token sequence for a corresponding prefix token, the main decoder skips decoding of tokens sequentially following the corresponding prefix token by next inputting, sequentially after the generating of the corresponding prefix token, the corresponding prefix token and the corresponding token sequence to the main decoder for further decoding processing by the main decoder.

26. The language processing apparatus of claim 21,
wherein the encoder is trained to perform a vector transformation of the source text in a first language for the obtaining of the context information, and
wherein the main decoder is trained to perform a translation of the context information into probabilistic information with respect to a different second language corresponding to the target text.

27. The language processing apparatus of claim 21, wherein, in response to the prefix token not satisfying the condition, the one or more processors are further configured to generate a token sequentially following the prefix token using the main decoder.

28. The language processing apparatus of claim 21, wherein the skip model includes a dictionary in which a plurality of words are arranged in alphabetical order.

29. The language processing apparatus of claim 21, wherein the skip model includes a neural network-based sub-decoder.

30. The language processing apparatus of claim 21, further comprising a memory comprising instructions, which when executed by the one or more processors, cause the one or more processors to be configured to implement the generating of the context information, generating of the prefix token, indicating of the target text, and the generating of the token sequence in response to the one or more processors determining that the prefix token satisfies the preset condition.

31. A processor implemented method for language processing using a neural network, the language processing method comprising:
decoding tokens from context information for a source text using a neural network-based main decoder, including sequentially decoding one or more tokens to identify a prefix token;
sequentially following the decoding of the one or more tokens, selecting between
generating a next token sequentially following the decoding of the one or more tokens, for a sequential decoding of the context information, and
skip decoding plural next tokens sequentially following the decoding of the one or more tokens, for a non-sequential decoding in bulk of the context information; and
identifying a target text based on a combination of the prefix token with a select one of the next token and the plural next tokens dependent on a result of the selecting.

32. The method of claim 31, further comprising indicating the target text as an inference result with respect to the source text.

33. The method of claim 31, further comprising obtaining the context information from the source text using a neural network-based encoder.

34. The method of claim 33,
wherein the encoder is trained to perform a vector transformation of the source text in a first language for the obtaining of the context information, and
wherein the main decoder is trained to perform a translation of the context information into probabilistic information with respect to a different second language corresponding to the target text.

35. The method of claim 31, wherein the selecting is dependent on a determination of whether the prefix token satisfies a preset condition.

36. The method of claim 35, further comprising, based on the determination, generating the plural next tokens using, as a skip model, a neural network-based sub-decoder.

37. The method of claim 36, wherein the determination includes determining whether a degree of difficulty of generating the plural next tokens is less than or equal to a threshold value.

38. The method of claim 35, further comprising, based on the determination, generating the plural next tokens using a skip model dictionary including plural words arranged in an alphabetical order and relatedness information with respect to differences in similarities respectively between the plural words.

39. The method of claim 38, wherein the determination includes determining whether a probability of the plural next tokens following the prefix token is greater than or equal to a threshold value.

40. The method of claim 31,
wherein the decoding of the tokens from the context information includes identifying a prefix token for each of a preset number of beam nodes, and
the skip decoding includes generating respective plural next tokens for each of the beam nodes.

41. The method of claim 40, wherein the identifying of the target text is further based on a determination of the target text from among candidate texts respectively including the prefix token and the generated respective plural next tokens for each of the beam nodes.

* * * * *